(12) United States Patent
Norstad et al.

(10) Patent No.: US 12,325,432 B2
(45) Date of Patent: *Jun. 10, 2025

(54) SYSTEM AND METHOD FOR CONTROLLING A VEHICLE

(71) Applicant: Polaris Industries Inc., Medina, MN (US)

(72) Inventors: Tim P. Norstad, Turtle Lake, WI (US); Louis J. Brady, Chisago City, MN (US); Brian R. Gillingham, Osceola, WI (US); Stephen L. Nelson, Osceola, WI (US); Jason R. Fields, Oak Grove, MN (US)

(73) Assignee: POLARIS INDUSTRIES INC., Medina, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/443,292

(22) Filed: Feb. 15, 2024

(65) Prior Publication Data
US 2024/0190448 A1 Jun. 13, 2024

Related U.S. Application Data

(60) Continuation of application No. 17/685,779, filed on Mar. 3, 2022, now Pat. No. 11,919,524, which is a
(Continued)

(51) Int. Cl.
B60G 17/016 (2006.01)
B60G 17/018 (2006.01)
(Continued)

(52) U.S. Cl.
CPC ....... *B60W 50/0098* (2013.01); *B60G 17/016* (2013.01); *B60G 17/018* (2013.01);
(Continued)

(58) Field of Classification Search
CPC .... B60G 17/016; B60G 17/018; B60G 17/02; B60G 17/06; B60W 50/00; B60W 2252/35; B60W 2252/05; B62D 5/04
See application file for complete search history.

(56) References Cited

U.S. PATENT DOCUMENTS 3,013,442 A 12/1961 Fox et al.
3,400,945 A 9/1968 Sampietro
(Continued)

FOREIGN PATENT DOCUMENTS

AU 2012323853 A1 5/2014
AU 2015328248 A1 5/2017
(Continued)

OTHER PUBLICATIONS

Trebi-Ollennu et al., Adaptive Fuzzy Throttle Control of an All Terrain Vehicle, 2001, Abstract.
(Continued)

Primary Examiner — Tan Q Nguyen
(74) Attorney, Agent, or Firm — SCHWEGMAN LUNDBERG & WOESSNER, P.A.

(57) ABSTRACT

A vehicle is provided including an electronic power steering system, an electronic throttle control system, and a stability control system.

18 Claims, 11 Drawing Sheets

Related U.S. Application Data continuation of application No. 16/455,846, filed on Jun. 28, 2019, now Pat. No. 11,285,964, which is a continuation of application No. 15/687,484, filed on Aug. 27, 2017, now Pat. No. 10,363,941, which is a division of application No. 14/928,121, filed on Oct. 30, 2015, now Pat. No. 9,771,084.

(60) Provisional application No. 62/073,724, filed on Oct. 31, 2014.

(51) Int. Cl.
| | | |
|---|---|---|
| *B60G 17/02* | (2006.01) | |
| *B60G 17/06* | (2006.01) | |
| *B60K 5/00* | (2006.01) | |
| *B60K 11/00* | (2006.01) | |
| *B60T 8/00* | (2006.01) | |
| *B60W 10/06* | (2006.01) | |
| *B60W 10/22* | (2006.01) | |
| *B60W 30/18* | (2012.01) | |
| *B60W 30/188* | (2012.01) | |
| *B60W 50/00* | (2006.01) | |
| *B60W 50/10* | (2012.01) | |
| *B62D 5/04* | (2006.01) | |
| *B62D 6/00* | (2006.01) | |
| *B62D 6/02* | (2006.01) | |
| *F02D 9/02* | (2006.01) | |

(52) U.S. Cl.
CPC ............ *B60G 17/02* (2013.01); *B60G 17/06* (2013.01); *B60K 5/00* (2013.01); *B60K 11/00* (2013.01); *B60T 8/00* (2013.01); *B60W 10/06* (2013.01); *B60W 10/22* (2013.01); *B60W 30/18136* (2013.01); *B60W 30/1882* (2013.01); *B60W 50/10* (2013.01); *B62D 5/0406* (2013.01); *B62D 5/0463* (2013.01); *B62D 5/0481* (2013.01); *B62D 6/002* (2013.01); *B62D 6/02* (2013.01); *F02D 9/02* (2013.01); *B60G 2300/07* (2013.01); *B60G 2300/124* (2013.01); *B60G 2300/13* (2013.01); *B60G 2500/10* (2013.01); *B60G 2500/20* (2013.01); *B60G 2500/30* (2013.01); *B60W 2540/10* (2013.01); *B60W 2540/12* (2013.01); *B60W 2552/05* (2020.02); *B60W 2552/35* (2020.02); *B60W 2710/0605* (2013.01)

(56) References Cited

U.S. PATENT DOCUMENTS

| | | | |
|---|---|---|---|
| 3,623,565 | A | 11/1971 | Ward et al. |
| 3,737,001 | A | 6/1973 | Rasenberger |
| 3,760,246 | A | 9/1973 | Wright et al. |
| 3,861,229 | A | 1/1975 | Domaas |
| 3,933,213 | A | 1/1976 | Trowbridge |
| 3,952,829 | A | 4/1976 | Gray |
| 3,982,446 | A | 9/1976 | Van Dyken |
| 4,075,841 | A | 2/1978 | Hamma et al. |
| 4,112,885 | A | 9/1978 | Iwata et al. |
| 4,116,006 | A | 9/1978 | Wallis |
| 4,319,658 | A | 3/1982 | Collonia et al. |
| 4,327,948 | A | 5/1982 | Beck et al. |
| 4,340,126 | A | 7/1982 | Larson |
| 4,453,516 | A | 6/1984 | Filsinger |
| 4,462,480 | A | 7/1984 | Yasui et al. |
| 4,508,078 | A | 4/1985 | Takeuchi et al. |
| 4,580,537 | A | 4/1986 | Uchiyama |
| 4,600,215 | A | 7/1986 | Kuroki et al. |
| 4,620,602 | A | 11/1986 | Capriotti |
| 4,658,662 | A | 4/1987 | Rundle |
| 4,671,235 | A | 6/1987 | Hosaka |
| 4,681,292 | A | 7/1987 | Scipio |
| 4,688,533 | A | 8/1987 | Otobe |
| 4,691,676 | A | 9/1987 | Kikuchi |
| 4,691,677 | A | 9/1987 | Hotate et al. |
| 4,722,548 | A | 2/1988 | Hamilton et al. |
| 4,741,554 | A | 5/1988 | Okamoto |
| 4,749,210 | A | 6/1988 | Sugasawa |
| 4,759,329 | A | 7/1988 | Nobuo et al. |
| 4,765,296 | A | 8/1988 | Ishikawa et al. |
| 4,770,438 | A * | 9/1988 | Sugasawa ........ B60G 17/01941 188/266.7 |
| 4,779,895 | A | 10/1988 | Rubel |
| 4,781,162 | A | 11/1988 | Ishikawa et al. |
| 4,785,782 | A | 11/1988 | Tanaka et al. |
| 4,787,353 | A | 11/1988 | Ishikawa et al. |
| 4,805,923 | A | 2/1989 | Soltis |
| 4,809,179 | A | 2/1989 | Klingler et al. |
| 4,809,659 | A | 3/1989 | Tamaki et al. |
| 4,817,466 | A | 4/1989 | Kawamura et al. |
| 4,819,174 | A | 4/1989 | Furuno et al. |
| 4,826,205 | A | 5/1989 | Kouda et al. |
| 4,827,416 | A | 5/1989 | Kawagoe et al. |
| 4,831,533 | A | 5/1989 | Skoeldheden |
| 4,838,780 | A | 6/1989 | Yamagata et al. |
| 4,856,477 | A | 8/1989 | Hanaoka et al. |
| 4,860,708 | A | 8/1989 | Yamaguchi et al. |
| 4,862,854 | A | 9/1989 | Oda et al. |
| 4,867,474 | A | 9/1989 | Smith |
| 4,881,428 | A | 11/1989 | Ishikawa et al. |
| 4,893,501 | A | 1/1990 | Sogawa |
| 4,895,343 | A | 1/1990 | Sato |
| 4,898,137 | A | 2/1990 | Fujita et al. |
| 4,898,138 | A | 2/1990 | Nishimura et al. |
| 4,901,695 | A | 2/1990 | Kabasin et al. |
| 4,903,983 | A | 2/1990 | Fukushima et al. |
| 4,905,783 | A | 3/1990 | Bober |
| 4,913,006 | A | 4/1990 | Tsuyama et al. |
| 4,919,097 | A | 4/1990 | Mitui et al. |
| 4,926,636 | A | 5/1990 | Tadokoro et al. |
| 4,927,170 | A | 5/1990 | Wada |
| 4,930,082 | A | 5/1990 | Harara et al. |
| 4,934,667 | A | 6/1990 | Pees et al. |
| 4,949,262 | A | 8/1990 | Buma et al. |
| 4,949,989 | A | 8/1990 | Kakizaki et al. |
| 4,961,146 | A | 10/1990 | Kajiwara |
| 4,966,247 | A | 10/1990 | Masuda |
| 4,969,695 | A | 11/1990 | Maehata et al. |
| 5,000,278 | A | 3/1991 | Morishita |
| 5,002,028 | A | 3/1991 | Arai et al. |
| 5,002,148 | A | 3/1991 | Miyake et al. |
| 5,015,009 | A | 5/1991 | Ohyama et al. |
| 5,018,408 | A | 5/1991 | Bota et al. |
| 5,024,460 | A | 6/1991 | Hanson et al. |
| 5,029,328 | A | 7/1991 | Kamimura et al. |
| 5,033,328 | A | 7/1991 | Shimanaka |
| 5,036,939 | A | 8/1991 | Johnson et al. |
| 5,037,128 | A | 8/1991 | Okuyama et al. |
| 5,040,114 | A | 8/1991 | Ishikawa et al. |
| 5,054,813 | A | 10/1991 | Kakizaki |
| 5,060,744 | A | 10/1991 | Katoh et al. |
| 5,062,657 | A | 11/1991 | Majeed |
| 5,071,157 | A | 12/1991 | Majeed |
| 5,071,158 | A | 12/1991 | Yonekawa et al. |
| 5,076,385 | A | 12/1991 | Terazawa et al. |
| 5,078,109 | A | 1/1992 | Yoshida et al. |
| 5,080,392 | A | 1/1992 | Bazergui |
| 5,083,811 | A | 1/1992 | Sato et al. |
| 5,088,464 | A | 2/1992 | Meaney |
| 5,090,728 | A * | 2/1992 | Yokoya ................ B60G 17/015 701/37 |
| 5,092,298 | A | 3/1992 | Suzuki et al. |
| 5,092,624 | A | 3/1992 | Fukuyama et al. |
| 5,096,219 | A | 3/1992 | Hanson et al. |
| 5,105,923 | A | 4/1992 | Iizuka |
| 5,113,345 | A | 5/1992 | Mine et al. |
| 5,113,821 | A | 5/1992 | Fukui et al. |
| 5,114,177 | A | 5/1992 | Fukunaga et al. |
| 5,129,475 | A | 7/1992 | Kawano et al. |

(56) References Cited

U.S. PATENT DOCUMENTS

| | | | |
|---|---|---|---|
| 5,134,566 A * | 7/1992 | Yokoya | B60G 17/015 702/85 |
| 5,144,559 A | 9/1992 | Kamimura et al. | |
| 5,150,635 A | 9/1992 | Minowa et al. | |
| 5,161,822 A | 11/1992 | Lund | |
| 5,163,538 A | 11/1992 | Derr et al. | |
| 5,170,343 A | 12/1992 | Matsuda | |
| 5,174,263 A | 12/1992 | Meaney | |
| 5,189,615 A | 2/1993 | Rubel et al. | |
| 5,218,540 A | 6/1993 | Ishikawa et al. | |
| 5,233,530 A | 8/1993 | Shimada et al. | |
| 5,253,728 A | 10/1993 | Matsuno et al. | |
| 5,265,693 A | 11/1993 | Rees et al. | |
| 5,307,777 A | 5/1994 | Sasajima et al. | |
| 5,314,362 A | 5/1994 | Nagahora | |
| 5,315,295 A | 5/1994 | Fujii | |
| 5,337,239 A | 8/1994 | Okuda | |
| 5,342,023 A | 8/1994 | Kuriki et al. | |
| 5,343,396 A | 8/1994 | Youngblood | |
| 5,343,780 A | 9/1994 | McDaniel et al. | |
| 5,350,187 A | 9/1994 | Shinozaki | |
| 5,361,209 A | 11/1994 | Tsutsumi | |
| 5,361,213 A | 11/1994 | Fujieda et al. | |
| 5,362,094 A | 11/1994 | Jensen | |
| 5,366,236 A | 11/1994 | Kuriki et al. | |
| 5,375,872 A | 12/1994 | Ohtagaki et al. | |
| 5,377,107 A | 12/1994 | Shimizu et al. | |
| 5,383,680 A | 1/1995 | Bock et al. | |
| 5,384,705 A | 1/1995 | Inagaki et al. | |
| 5,390,121 A | 2/1995 | Wolfe | |
| 5,391,127 A | 2/1995 | Nishimura | |
| RE34,906 E | 4/1995 | Tamaki et al. | |
| 5,406,920 A | 4/1995 | Murata et al. | |
| 5,413,540 A | 5/1995 | Streib et al. | |
| 5,443,558 A | 8/1995 | Ibaraki et al. | |
| 5,444,621 A | 8/1995 | Matsunaga et al. | |
| 5,446,663 A | 8/1995 | Sasaki et al. | |
| 5,467,751 A | 11/1995 | Kumagai | |
| 5,475,593 A | 12/1995 | Townend | |
| 5,475,596 A | 12/1995 | Henry et al. | |
| 5,483,448 A | 1/1996 | Liubakka et al. | |
| 5,485,161 A | 1/1996 | Vaughn | |
| 5,487,006 A * | 1/1996 | Kakizaki | B60G 17/0165 280/5.515 |
| 5,490,487 A | 2/1996 | Kato et al. | |
| 5,510,985 A | 4/1996 | Yamaoka et al. | |
| 5,514,049 A | 5/1996 | Kamio et al. | |
| 5,515,273 A | 5/1996 | Sasaki et al. | |
| 5,521,825 A | 5/1996 | Unuvar et al. | |
| 5,524,724 A | 6/1996 | Nishigaki et al. | |
| 5,550,739 A | 8/1996 | Hoffmann et al. | |
| 5,555,499 A | 9/1996 | Yamashita et al. | |
| 5,575,737 A | 11/1996 | Weiss | |
| 5,586,032 A | 12/1996 | Kallenbach et al. | |
| 5,611,309 A | 3/1997 | Kumagai et al. | |
| 5,630,623 A | 5/1997 | Ganzel | |
| 5,632,503 A | 5/1997 | Raad et al. | |
| 5,645,033 A | 7/1997 | Person et al. | |
| 5,678,847 A | 10/1997 | Izawa et al. | |
| 5,713,428 A | 2/1998 | Linden et al. | |
| 5,749,596 A | 5/1998 | Jensen et al. | |
| 5,774,820 A | 6/1998 | Linden et al. | |
| 5,832,398 A | 11/1998 | Sasaki et al. | |
| 5,845,726 A | 12/1998 | Kikkawa et al. | |
| 5,873,802 A | 2/1999 | Tabata et al. | |
| 5,880,532 A | 3/1999 | Stopher | |
| 5,890,870 A | 4/1999 | Berger et al. | |
| 5,897,287 A | 4/1999 | Berger et al. | |
| 5,921,889 A | 7/1999 | Nozaki et al. | |
| 5,922,038 A | 7/1999 | Horiuchi et al. | |
| 5,938,556 A | 8/1999 | Lowell | |
| 5,957,992 A | 9/1999 | Kiyono | |
| 5,992,558 A | 11/1999 | Noro et al. | |
| 6,000,702 A | 12/1999 | Streiter | |
| 6,002,975 A | 12/1999 | Schiffmann et al. | |
| 6,016,795 A | 1/2000 | Ohki | |
| 6,019,085 A | 2/2000 | Sato et al. | |
| 6,032,752 A | 3/2000 | Karpik et al. | |
| 6,038,500 A | 3/2000 | Weiss | |
| 6,070,681 A | 6/2000 | Catanzarite et al. | |
| 6,073,072 A | 6/2000 | Ishii et al. | |
| 6,073,074 A | 6/2000 | Saito et al. | |
| 6,076,027 A | 6/2000 | Raad et al. | |
| 6,078,252 A | 6/2000 | Kulczycki et al. | |
| 6,086,510 A | 7/2000 | Kadota | |
| 6,094,614 A | 7/2000 | Hiwatashi | |
| 6,112,866 A | 9/2000 | Boichot et al. | |
| 6,120,399 A | 9/2000 | Okeson et al. | |
| 6,122,568 A | 9/2000 | Madau et al. | |
| 6,124,826 A | 9/2000 | Garthwaite et al. | |
| 6,125,326 A | 9/2000 | Ohmura et al. | |
| 6,125,782 A | 10/2000 | Takashima et al. | |
| 6,134,499 A | 10/2000 | Goode et al. | |
| 6,138,069 A | 10/2000 | Ellertson et al. | |
| 6,148,252 A | 11/2000 | Iwasaki et al. | |
| 6,154,703 A | 11/2000 | Nakai et al. | |
| 6,155,545 A | 12/2000 | Noro et al. | |
| 6,157,297 A | 12/2000 | Nakai | |
| 6,157,890 A | 12/2000 | Nakai et al. | |
| 6,161,908 A | 12/2000 | Takayama et al. | |
| 6,167,341 A | 12/2000 | Gourmelen et al. | |
| 6,170,923 B1 | 1/2001 | Iguchi et al. | |
| 6,176,796 B1 | 1/2001 | Lislegard | |
| 6,178,371 B1 | 1/2001 | Light et al. | |
| 6,181,997 B1 | 1/2001 | Badenoch et al. | |
| 6,192,305 B1 | 2/2001 | Schiffmann | |
| 6,206,124 B1 | 3/2001 | Mallette et al. | |
| 6,217,480 B1 | 4/2001 | Iwata et al. | |
| 6,226,389 B1 | 5/2001 | Lemelson et al. | |
| 6,240,365 B1 | 5/2001 | Bunn | |
| 6,244,398 B1 | 6/2001 | Girvin et al. | |
| 6,244,986 B1 | 6/2001 | Mori et al. | |
| 6,249,728 B1 | 6/2001 | Streiter | |
| 6,249,744 B1 | 6/2001 | Morita | |
| 6,254,108 B1 | 7/2001 | Germain et al. | |
| 6,260,650 B1 | 7/2001 | Gustavsson | |
| 6,263,858 B1 | 7/2001 | Pursifull et al. | |
| 6,275,763 B1 | 8/2001 | Lotito et al. | |
| 6,276,333 B1 | 8/2001 | Kazama et al. | |
| 6,288,534 B1 | 9/2001 | Starkweather et al. | |
| 6,290,034 B1 | 9/2001 | Ichimaru | |
| 6,318,337 B1 | 11/2001 | Pursifull | |
| 6,318,490 B1 | 11/2001 | Laning | |
| 6,343,248 B1 | 1/2002 | Rizzotto et al. | |
| 6,351,704 B1 | 2/2002 | Koerner | |
| 6,352,142 B1 | 3/2002 | Kim | |
| 6,370,458 B1 | 4/2002 | Shal et al. | |
| 6,370,472 B1 | 4/2002 | Fosseen | |
| 6,371,884 B1 | 4/2002 | Channing | |
| 6,379,114 B1 | 4/2002 | Schott et al. | |
| 6,427,115 B1 | 7/2002 | Sekiyama | |
| 6,456,908 B1 | 9/2002 | Kumar | |
| 6,463,385 B1 | 10/2002 | Fry | |
| 6,470,852 B1 | 10/2002 | Kanno | |
| 6,476,714 B2 | 11/2002 | Mizuta | |
| 6,483,201 B1 | 11/2002 | Klarer | |
| 6,483,467 B2 | 11/2002 | Kushida et al. | |
| 6,485,340 B1 | 11/2002 | Kolb et al. | |
| 6,488,609 B1 | 12/2002 | Morimoto et al. | |
| 6,502,025 B1 | 12/2002 | Kempen | |
| 6,507,778 B2 | 1/2003 | Koh | |
| 6,513,611 B2 | 2/2003 | Ito et al. | |
| 6,526,342 B1 | 2/2003 | Burdock et al. | |
| 6,551,153 B1 | 4/2003 | Hattori | |
| 6,573,827 B1 | 6/2003 | McKenzie | |
| 6,581,710 B2 | 6/2003 | Sprinkle et al. | |
| 6,604,034 B1 | 8/2003 | Speck et al. | |
| 6,644,318 B1 | 11/2003 | Adams et al. | |
| 6,647,328 B2 | 11/2003 | Walker | |
| 6,655,233 B2 | 12/2003 | Evans et al. | |
| 6,657,539 B2 | 12/2003 | Yamamoto et al. | |
| 6,675,577 B2 | 1/2004 | Evans | |
| 6,684,140 B2 | 1/2004 | Lu | |
| 6,685,174 B2 | 2/2004 | Behmenburg et al. | |

(56) References Cited

U.S. PATENT DOCUMENTS

| | | |
|---|---|---|
| 6,699,085 B2 | 3/2004 | Hattori |
| 6,704,643 B1 | 3/2004 | Suhre et al. |
| 6,719,313 B2 | 4/2004 | Zadok |
| 6,738,705 B2 | 5/2004 | Kojima et al. |
| 6,738,708 B2 | 5/2004 | Suzuki et al. |
| 6,752,401 B2 | 6/2004 | Burdock |
| 6,757,606 B1 | 6/2004 | Gonring |
| 6,761,145 B2 | 7/2004 | Matsuda et al. |
| 6,772,061 B1 | 8/2004 | Berthiaume et al. |
| 6,795,764 B2 | 9/2004 | Schmitz et al. |
| 6,820,712 B2 | 11/2004 | Nakamura |
| 6,834,736 B2 | 12/2004 | Kramer et al. |
| 6,839,630 B2 | 1/2005 | Sakamoto |
| 6,845,314 B2 | 1/2005 | Fosseen |
| 6,845,829 B2 | 1/2005 | Hafendorfer |
| 6,848,420 B2 | 2/2005 | Ishiguro et al. |
| 6,848,956 B2 | 2/2005 | Ozawa |
| 6,851,495 B2 | 2/2005 | Sprinkle et al. |
| 6,851,679 B2 | 2/2005 | Downey et al. |
| 6,860,826 B1 | 3/2005 | Johnson |
| 6,874,467 B2 | 4/2005 | Hunt et al. |
| 6,876,924 B2 | 4/2005 | Morita et al. |
| 6,880,532 B1 | 4/2005 | Kerns et al. |
| 6,886,529 B2 | 5/2005 | Suzuki et al. |
| 6,887,182 B2 | 5/2005 | Nakatani et al. |
| 6,889,654 B2 | 5/2005 | Ito |
| 6,895,318 B1 | 5/2005 | Barton et al. |
| 6,895,518 B2 | 5/2005 | Wingen |
| 6,897,629 B2 | 5/2005 | Wilton et al. |
| 6,938,508 B1 | 9/2005 | Saagge |
| 6,941,209 B2 | 9/2005 | Liu |
| 6,942,050 B1 | 9/2005 | Honkala et al. |
| 6,945,541 B2 | 9/2005 | Brown |
| 6,964,259 B1 | 11/2005 | Raetzman |
| 6,964,260 B2 | 11/2005 | Samoto et al. |
| 6,976,689 B2 | 12/2005 | Hibbert |
| 6,990,401 B2 | 1/2006 | Neiss et al. |
| 7,005,976 B2 | 2/2006 | Hagenbuch |
| 7,011,174 B1 | 3/2006 | James |
| 7,032,895 B2 | 4/2006 | Folchert |
| 7,035,836 B2 | 4/2006 | Caponetto et al. |
| 7,036,485 B1 | 5/2006 | Koerner |
| 7,044,260 B2 | 5/2006 | Schaedler et al. |
| 7,055,454 B1 | 6/2006 | Whiting et al. |
| 7,055,497 B2 | 6/2006 | Maehara et al. |
| 7,055,545 B2 | 6/2006 | Mascari et al. |
| 7,058,490 B2 | 6/2006 | Kim |
| 7,058,506 B2 | 6/2006 | Kawase et al. |
| 7,066,142 B2 | 6/2006 | Hanasato |
| 7,070,012 B2 | 7/2006 | Fecteau |
| 7,076,351 B2 | 7/2006 | Hamilton et al. |
| 7,077,713 B2 | 7/2006 | Watabe et al. |
| 7,077,784 B2 | 7/2006 | Banta et al. |
| 7,086,379 B2 | 8/2006 | Blomenberg et al. |
| 7,092,808 B2 | 8/2006 | Lu et al. |
| 7,096,851 B2 | 8/2006 | Matsuda et al. |
| 7,097,166 B2 | 8/2006 | Folchert |
| 7,104,352 B2 | 9/2006 | Weinzierl |
| 7,123,189 B2 | 10/2006 | Lalik et al. |
| 7,124,865 B2 | 10/2006 | Turner et al. |
| 7,136,729 B2 | 11/2006 | Salman et al. |
| 7,140,619 B2 | 11/2006 | Hrovat et al. |
| 7,163,000 B2 | 1/2007 | Ishida et al. |
| 7,168,709 B2 | 1/2007 | Niwa et al. |
| 7,171,945 B2 | 2/2007 | Matsuda et al. |
| 7,171,947 B2 | 2/2007 | Fukushima et al. |
| 7,182,063 B2 | 2/2007 | Keefover et al. |
| 7,184,873 B1 | 2/2007 | Idsinga et al. |
| 7,185,630 B2 | 3/2007 | Takahashi et al. |
| 7,220,153 B2 | 5/2007 | Okuyama |
| 7,233,846 B2 | 6/2007 | Kawauchi et al. |
| 7,234,707 B2 | 6/2007 | Green et al. |
| 7,235,963 B2 | 6/2007 | Wayama |
| 7,249,986 B2 | 7/2007 | Otobe et al. |
| 7,259,357 B2 | 8/2007 | Walker |
| 7,260,319 B2 | 8/2007 | Watanabe et al. |
| 7,260,471 B2 | 8/2007 | Matsuda et al. |
| 7,270,335 B2 | 9/2007 | Hio et al. |
| 7,280,904 B2 | 10/2007 | Kaji |
| 7,286,919 B2 | 10/2007 | Nordgren et al. |
| 7,287,511 B2 | 10/2007 | Matsuda |
| 7,287,760 B1 | 10/2007 | Quick et al. |
| 7,305,295 B2 | 12/2007 | Bauerle et al. |
| 7,311,082 B2 | 12/2007 | Yokoi |
| 7,315,779 B1 | 1/2008 | Rioux et al. |
| 7,316,288 B1 | 1/2008 | Bennett et al. |
| 7,318,410 B2 | 1/2008 | Yokoi |
| 7,318,593 B2 | 1/2008 | Sterly et al. |
| 7,322,435 B2 | 1/2008 | Lillbacka et al. |
| 7,325,533 B2 | 2/2008 | Matsuda |
| 7,331,326 B2 | 2/2008 | Arai et al. |
| 7,354,321 B2 | 4/2008 | Takada et al. |
| 7,359,787 B2 | 4/2008 | Ono et al. |
| 7,367,247 B2 | 5/2008 | Horiuchi et al. |
| 7,367,316 B2 | 5/2008 | Russell et al. |
| 7,367,854 B2 | 5/2008 | Arvidsson |
| 7,380,538 B1 | 6/2008 | Gagnon et al. |
| 7,386,378 B2 | 6/2008 | Lauwerys et al. |
| 7,399,210 B2 | 7/2008 | Yoshimasa |
| 7,401,794 B2 | 7/2008 | Laurent et al. |
| 7,413,196 B2 | 8/2008 | Borowski |
| 7,416,458 B2 | 8/2008 | Suemori et al. |
| 7,421,954 B2 | 9/2008 | Bose |
| 7,422,495 B2 | 9/2008 | Kinoshita et al. |
| 7,427,072 B2 | 9/2008 | Brown |
| 7,431,013 B2 | 10/2008 | Hotta et al. |
| 7,433,774 B2 | 10/2008 | Sen et al. |
| 7,441,789 B2 | 10/2008 | Geiger et al. |
| 7,445,071 B2 | 11/2008 | Yamazaki et al. |
| 7,454,282 B2 | 11/2008 | Mizuguchi |
| 7,454,284 B2 | 11/2008 | Fosseen |
| 7,458,360 B2 | 12/2008 | Irihune et al. |
| 7,461,630 B2 | 12/2008 | Maruo et al. |
| 7,475,746 B2 | 1/2009 | Tsukada et al. |
| 7,478,689 B1 | 1/2009 | Sugden et al. |
| 7,483,775 B2 | 1/2009 | Karaba et al. |
| 7,486,199 B2 | 2/2009 | Tengler et al. |
| 7,505,836 B2 | 3/2009 | Okuyama et al. |
| 7,506,633 B2 | 3/2009 | Cowan |
| 7,510,060 B2 | 3/2009 | Izawa et al. |
| 7,523,737 B2 | 4/2009 | Deguchi et al. |
| 7,526,665 B2 | 4/2009 | Kim et al. |
| 7,529,609 B2 | 5/2009 | Braunberger et al. |
| 7,530,345 B1 | 5/2009 | Plante et al. |
| 7,533,750 B2 | 5/2009 | Simmons et al. |
| 7,533,890 B2 | 5/2009 | Chiao |
| 7,571,039 B2 | 8/2009 | Chen et al. |
| 7,571,073 B2 | 8/2009 | Gamberini et al. |
| 7,598,849 B2 | 10/2009 | Gallant et al. |
| 7,600,762 B2 | 10/2009 | Yasui et al. |
| 7,611,154 B2 | 11/2009 | Delaney |
| 7,630,807 B2 | 12/2009 | Yoshimura et al. |
| 7,641,208 B1 | 1/2010 | Barron et al. |
| 7,644,934 B2 | 1/2010 | Mizuta |
| 7,647,143 B2 | 1/2010 | Ito et al. |
| 7,684,911 B2 | 3/2010 | Seifert et al. |
| 7,707,012 B2 | 4/2010 | Stephens |
| 7,711,468 B1 | 5/2010 | Levy |
| 7,740,256 B2 | 6/2010 | Davis |
| 7,751,959 B2 | 7/2010 | Boon et al. |
| 7,771,313 B2 | 8/2010 | Cullen et al. |
| 7,778,741 B2 | 8/2010 | Rao et al. |
| 7,810,818 B2 | 10/2010 | Bushko |
| 7,815,205 B2 | 10/2010 | Barth et al. |
| 7,822,514 B1 | 10/2010 | Erickson |
| 7,823,106 B2 | 10/2010 | Baker et al. |
| 7,823,891 B2 | 11/2010 | Bushko et al. |
| 7,826,959 B2 | 11/2010 | Namari et al. |
| 7,862,061 B2 | 1/2011 | Jung |
| 7,885,750 B2 | 2/2011 | Lu |
| 7,899,594 B2 | 3/2011 | Messih et al. |
| 7,912,610 B2 | 3/2011 | Saito et al. |
| 7,926,822 B2 | 4/2011 | Ohletz et al. |
| 7,940,383 B2 | 5/2011 | Noguchi et al. |

(56) References Cited

U.S. PATENT DOCUMENTS

| | | |
|---|---|---|
| 7,942,427 B2 | 5/2011 | Lloyd |
| 7,950,486 B2 | 5/2011 | Van et al. |
| 7,959,163 B2 | 6/2011 | Beno et al. |
| 7,962,261 B2 | 6/2011 | Bushko et al. |
| 7,963,529 B2 | 6/2011 | Oteman et al. |
| 7,970,512 B2 | 6/2011 | Lu et al. |
| 7,975,794 B2 | 7/2011 | Simmons |
| 7,984,915 B2 | 7/2011 | Post et al. |
| 8,005,596 B2 | 8/2011 | Lu et al. |
| 8,027,775 B2 | 9/2011 | Takenaka et al. |
| 8,032,281 B2 | 10/2011 | Bujak et al. |
| 8,050,818 B2 | 11/2011 | Mizuta |
| 8,050,857 B2 | 11/2011 | Lu et al. |
| 8,056,392 B2 | 11/2011 | Ryan et al. |
| 8,065,054 B2 | 11/2011 | Tarasinski et al. |
| 8,075,002 B1 | 12/2011 | Pionke et al. |
| 8,086,371 B2 | 12/2011 | Furuichi et al. |
| 8,087,676 B2 | 1/2012 | McIntyre |
| 8,095,268 B2 | 1/2012 | Parison et al. |
| 8,108,104 B2 | 1/2012 | Hrovat et al. |
| 8,113,521 B2 | 2/2012 | Lin et al. |
| 8,116,938 B2 | 2/2012 | Itagaki et al. |
| 8,121,757 B2 | 2/2012 | Song et al. |
| 8,170,749 B2 | 5/2012 | Mizuta |
| 8,190,327 B2 | 5/2012 | Poilbout |
| 8,195,361 B2 | 6/2012 | Kajino et al. |
| 8,204,666 B2 | 6/2012 | Takeuchi et al. |
| 8,209,087 B2 | 6/2012 | Haegglund et al. |
| 8,214,106 B2 | 7/2012 | Ghoneim et al. |
| 8,219,262 B2 | 7/2012 | Stiller |
| 8,229,642 B2 | 7/2012 | Post et al. |
| 8,260,496 B2 | 9/2012 | Gagliano |
| 8,271,175 B2 | 9/2012 | Takenaka et al. |
| 8,296,010 B2 | 10/2012 | Hirao et al. |
| 8,308,170 B2 | 11/2012 | Van et al. |
| 8,315,764 B2 | 11/2012 | Chen et al. |
| 8,315,769 B2 | 11/2012 | Braunberger et al. |
| 8,321,088 B2 | 11/2012 | Brown et al. |
| 8,322,497 B2 | 12/2012 | Marjoram et al. |
| 8,352,143 B2 | 1/2013 | Lu et al. |
| 8,355,840 B2 | 1/2013 | Ammon et al. |
| 8,359,149 B2 | 1/2013 | Shin |
| 8,374,748 B2 | 2/2013 | Jolly |
| 8,376,373 B2 | 2/2013 | Conradie |
| 8,382,130 B2 | 2/2013 | Nakamura |
| 8,396,627 B2 | 3/2013 | Jung et al. |
| 8,417,417 B2 | 4/2013 | Chen et al. |
| 8,424,832 B2 | 4/2013 | Robbins et al. |
| 8,428,839 B2 | 4/2013 | Braunberger et al. |
| 8,434,774 B2 | 5/2013 | Leclerc et al. |
| 8,437,935 B2 | 5/2013 | Braunberger et al. |
| 8,442,720 B2 | 5/2013 | Lu et al. |
| 8,444,161 B2 | 5/2013 | Leclerc et al. |
| 8,447,489 B2 | 5/2013 | Murata et al. |
| 8,457,841 B2 | 6/2013 | Knoll et al. |
| 8,473,157 B2 | 6/2013 | Savaresi et al. |
| 8,517,395 B2 | 8/2013 | Knox et al. |
| 8,532,896 B2 | 9/2013 | Braunberger et al. |
| 8,534,397 B2 | 9/2013 | Grajkowski et al. |
| 8,534,413 B2 | 9/2013 | Nelson et al. |
| 8,548,678 B2 | 10/2013 | Ummethala et al. |
| 8,550,221 B2 | 10/2013 | Paulides et al. |
| 8,571,776 B2 | 10/2013 | Braunberger et al. |
| 8,573,605 B2 | 11/2013 | Di Maria |
| 8,626,388 B2 | 1/2014 | Oikawa |
| 8,626,389 B2 | 1/2014 | Sidlosky |
| 8,641,052 B2 | 2/2014 | Kondo et al. |
| 8,645,024 B2 | 2/2014 | Daniels |
| 8,651,503 B2 | 2/2014 | Rhodig |
| 8,666,596 B2 | 3/2014 | Arenz |
| 8,672,106 B2 | 3/2014 | Laird et al. |
| 8,672,337 B2 | 3/2014 | Van et al. |
| 8,676,440 B2 | 3/2014 | Watson |
| 8,682,530 B2 | 3/2014 | Nakamura |
| 8,682,550 B2 | 3/2014 | Nelson et al. |
| 8,682,558 B2 | 3/2014 | Braunberger et al. |
| 8,684,887 B2 | 4/2014 | Krosschell |
| 8,700,260 B2 | 4/2014 | Jolly et al. |
| 8,712,599 B1 | 4/2014 | Westpfahl |
| 8,712,639 B2 | 4/2014 | Lu et al. |
| 8,718,872 B2 | 5/2014 | Hirao et al. |
| 8,725,351 B1 | 5/2014 | Selden et al. |
| 8,725,380 B2 | 5/2014 | Braunberger et al. |
| 8,731,774 B2 | 5/2014 | Yang |
| 8,770,594 B2 | 7/2014 | Tominaga et al. |
| 8,827,019 B2 | 9/2014 | Deckard et al. |
| 8,903,617 B2 | 12/2014 | Braunberger et al. |
| 8,954,251 B2 | 2/2015 | Braunberger et al. |
| 8,972,712 B2 | 3/2015 | Braunberger |
| 8,973,930 B2 | 3/2015 | Rhodig |
| 8,994,494 B2 | 3/2015 | Koenig et al. |
| 8,997,952 B2 | 4/2015 | Getz et al. |
| 9,010,768 B2 | 4/2015 | Kinsman et al. |
| 9,027,937 B2 | 5/2015 | Ryan et al. |
| 9,038,791 B2 | 5/2015 | Marking |
| 9,050,869 B1 | 6/2015 | Pelzer |
| 9,123,249 B2 | 9/2015 | Braunberger et al. |
| 9,150,070 B2 | 10/2015 | Luttinen et al. |
| 9,151,384 B2 | 10/2015 | Kohler et al. |
| 9,162,573 B2 | 10/2015 | Grajkowski et al. |
| 9,186,952 B2 | 11/2015 | Yleva |
| 9,205,717 B2 | 12/2015 | Brady et al. |
| 9,211,924 B2 | 12/2015 | Safranski et al. |
| 9,327,726 B2 | 5/2016 | Braunberger et al. |
| 9,327,789 B1 | 5/2016 | Vezina et al. |
| 9,365,251 B2 | 6/2016 | Safranski et al. |
| 9,371,002 B2 | 6/2016 | Braunberger |
| 9,381,810 B2 | 7/2016 | Nelson et al. |
| 9,381,902 B2 | 7/2016 | Braunberger et al. |
| 9,428,242 B2 | 8/2016 | Ginther et al. |
| 9,429,235 B2 | 8/2016 | Krosschell et al. |
| 9,527,362 B2 | 12/2016 | Scheuerell et al. |
| 9,643,538 B2 | 5/2017 | Braunberger et al. |
| 9,643,616 B2 | 5/2017 | Lu |
| 9,662,954 B2 | 5/2017 | Scheuerell et al. |
| 9,665,418 B2 | 5/2017 | Arnott et al. |
| 9,695,899 B2 | 7/2017 | Smith et al. |
| 9,771,084 B2 | 9/2017 | Norstad |
| 9,802,621 B2 | 10/2017 | Gillingham et al. |
| 9,809,195 B2 | 11/2017 | Giese et al. |
| 9,830,821 B2 | 11/2017 | Braunberger et al. |
| 9,834,184 B2 | 12/2017 | Braunberger |
| 9,834,215 B2 | 12/2017 | Braunberger et al. |
| 9,855,986 B2 | 1/2018 | Braunberger et al. |
| 9,868,385 B2 | 1/2018 | Braunberger |
| 9,878,693 B2 | 1/2018 | Braunberger |
| 9,920,810 B2 | 3/2018 | Smeljanskij et al. |
| 9,937,762 B2 | 4/2018 | Sunahiro |
| 9,945,298 B2 | 4/2018 | Braunberger et al. |
| 10,005,335 B2 | 6/2018 | Brady et al. |
| 10,046,694 B2 | 8/2018 | Braunberger et al. |
| 10,086,698 B2 | 10/2018 | Grajkowski et al. |
| 10,137,873 B2 | 11/2018 | Bowers et al. |
| 10,154,377 B2 | 12/2018 | Post et al. |
| 10,189,428 B1 | 1/2019 | Sellars et al. |
| 10,195,989 B2 | 2/2019 | Braunberger et al. |
| 10,202,159 B2 | 2/2019 | Braunberger et al. |
| 10,207,554 B2 | 2/2019 | Schroeder et al. |
| 10,220,765 B2 | 3/2019 | Braunberger |
| 10,227,041 B2 | 3/2019 | Braunberger et al. |
| 10,266,164 B2 | 4/2019 | Braunberger |
| 10,363,941 B2 | 7/2019 | Norstad |
| 10,384,682 B2 | 8/2019 | Braunberger et al. |
| 10,391,989 B2 | 8/2019 | Braunberger |
| 10,406,884 B2 | 9/2019 | Oakden-Graus et al. |
| 10,410,520 B2 | 9/2019 | Braunberger et al. |
| 10,436,125 B2 | 10/2019 | Braunberger et al. |
| 10,450,006 B2 | 10/2019 | Kinsman et al. |
| 10,479,408 B2 | 11/2019 | Upah et al. |
| 10,578,184 B2 | 3/2020 | Gilbert et al. |
| 10,704,640 B2 | 7/2020 | Galasso et al. |
| 10,723,408 B2 | 7/2020 | Pelot |
| 10,731,724 B2 | 8/2020 | Laird et al. |
| 10,774,896 B2 | 9/2020 | Hamers et al. |

(56) References Cited

U.S. PATENT DOCUMENTS

| | | |
|---|---|---|
| 10,933,710 B2 | 3/2021 | Tong |
| 10,975,780 B2 | 4/2021 | Wishin et al. |
| 10,981,429 B2 | 4/2021 | Tsiaras et al. |
| 11,001,120 B2 | 5/2021 | Cox |
| 11,110,913 B2 | 9/2021 | Krosschell et al. |
| 11,124,036 B2 | 9/2021 | Brady et al. |
| 11,142,033 B2 | 10/2021 | Yoshida et al. |
| 11,148,748 B2 | 10/2021 | Galasso |
| 11,152,555 B2 | 10/2021 | Hiller |
| 11,162,555 B2 | 11/2021 | Haugen |
| 11,192,414 B1 | 12/2021 | Berardi |
| 11,192,424 B2 | 12/2021 | Tabata et al. |
| 11,279,198 B2 | 3/2022 | Marking |
| 11,285,964 B2 | 3/2022 | Norstad et al. |
| 11,306,798 B2 | 4/2022 | Cox et al. |
| 11,351,834 B2 | 6/2022 | Cox |
| 11,364,762 B2 | 6/2022 | Hadi |
| 11,400,784 B2 | 8/2022 | Brady et al. |
| 11,400,785 B2 | 8/2022 | Brady et al. |
| 11,400,786 B2 | 8/2022 | Brady et al. |
| 11,400,787 B2 | 8/2022 | Brady et al. |
| 11,413,924 B2 | 8/2022 | Cox et al. |
| 11,448,283 B2 | 9/2022 | Strickland |
| 11,472,252 B2 | 10/2022 | Tong |
| 11,479,075 B2 | 10/2022 | Graus et al. |
| 11,975,584 B2 | 5/2024 | Graus et al. |
| 2001/0005803 A1 | 6/2001 | Cochofel et al. |
| 2001/0021887 A1 | 9/2001 | Obradovich et al. |
| 2001/0035166 A1 | 11/2001 | Kerns et al. |
| 2001/0052756 A1 | 12/2001 | Noro et al. |
| 2002/0045977 A1* | 4/2002 | Uchiyama ........ B60G 17/01908 280/5.515 |
| 2002/0082752 A1 | 6/2002 | Obradovich |
| 2002/0113185 A1 | 8/2002 | Ziegler |
| 2002/0113393 A1 | 8/2002 | Urbach |
| 2002/0115357 A1 | 8/2002 | Hiki et al. |
| 2002/0125675 A1 | 9/2002 | Clements et al. |
| 2002/0177949 A1 | 11/2002 | Katayama et al. |
| 2002/0193935 A1 | 12/2002 | Hashimoto et al. |
| 2003/0014174 A1 | 1/2003 | Giers |
| 2003/0036360 A1 | 2/2003 | Russell et al. |
| 2003/0036823 A1 | 2/2003 | Mahvi |
| 2003/0038411 A1 | 2/2003 | Sendrea |
| 2003/0046000 A1 | 3/2003 | Morita et al. |
| 2003/0047994 A1 | 3/2003 | Koh |
| 2003/0054831 A1 | 3/2003 | Bardmesser |
| 2003/0062025 A1 | 4/2003 | Samoto et al. |
| 2003/0125857 A1 | 7/2003 | Madau et al. |
| 2003/0187555 A1 | 10/2003 | Lutz et al. |
| 2003/0200016 A1 | 10/2003 | Spillane et al. |
| 2003/0205867 A1 | 11/2003 | Coelingh et al. |
| 2004/0010383 A1 | 1/2004 | Lu et al. |
| 2004/0015275 A1 | 1/2004 | Herzog et al. |
| 2004/0024515 A1 | 2/2004 | Troupe et al. |
| 2004/0026880 A1 | 2/2004 | Bundy |
| 2004/0034460 A1 | 2/2004 | Folkerts et al. |
| 2004/0041358 A1 | 3/2004 | Hrovat et al. |
| 2004/0090020 A1 | 5/2004 | Braswell |
| 2004/0094912 A1 | 5/2004 | Niwa et al. |
| 2004/0107591 A1 | 6/2004 | Cuddy |
| 2004/0216550 A1 | 11/2004 | Fallak et al. |
| 2004/0226538 A1 | 11/2004 | Cannone et al. |
| 2004/0245034 A1 | 12/2004 | Miyamoto et al. |
| 2005/0004736 A1 | 1/2005 | Belcher et al. |
| 2005/0023789 A1 | 2/2005 | Suzuki et al. |
| 2005/0027428 A1 | 2/2005 | Glora et al. |
| 2005/0045148 A1 | 3/2005 | Katsuragawa et al. |
| 2005/0077696 A1 | 4/2005 | Ogawa |
| 2005/0098964 A1 | 5/2005 | Brown |
| 2005/0131604 A1 | 6/2005 | Lu |
| 2005/0133006 A1 | 6/2005 | Frenz et al. |
| 2005/0149246 A1 | 7/2005 | McLeod |
| 2005/0155571 A1 | 7/2005 | Hanasato |
| 2005/0178628 A1* | 8/2005 | Uchino ................ B60G 17/016 188/379 |
| 2005/0217953 A1 | 10/2005 | Bossard |
| 2005/0267663 A1 | 12/2005 | Naono et al. |
| 2005/0279244 A1 | 12/2005 | Bose |
| 2005/0280219 A1 | 12/2005 | Brown |
| 2005/0284446 A1 | 12/2005 | Okuyama |
| 2006/0014606 A1 | 1/2006 | Sporl et al. |
| 2006/0017240 A1 | 1/2006 | Laurent et al. |
| 2006/0018636 A1 | 1/2006 | Watanabe et al. |
| 2006/0052909 A1 | 3/2006 | Cherouny |
| 2006/0064223 A1 | 3/2006 | Voss |
| 2006/0065239 A1 | 3/2006 | Tsukada et al. |
| 2006/0112930 A1 | 6/2006 | Matsuda et al. |
| 2006/0162681 A1 | 7/2006 | Kawasaki |
| 2006/0191739 A1 | 8/2006 | Koga |
| 2006/0224294 A1 | 10/2006 | Kawazoe et al. |
| 2006/0226611 A1 | 10/2006 | Xiao et al. |
| 2006/0229811 A1 | 10/2006 | Herman et al. |
| 2006/0235602 A1 | 10/2006 | Ishida et al. |
| 2006/0243246 A1 | 11/2006 | Yokoi |
| 2006/0243247 A1 | 11/2006 | Yokoi |
| 2006/0247840 A1 | 11/2006 | Matsuda et al. |
| 2006/0270520 A1 | 11/2006 | Owens |
| 2006/0278197 A1 | 12/2006 | Takamatsu et al. |
| 2006/0284387 A1 | 12/2006 | Klees |
| 2007/0007742 A1 | 1/2007 | Allen et al. |
| 2007/0023566 A1 | 2/2007 | Howard |
| 2007/0028888 A1 | 2/2007 | Jasem |
| 2007/0039770 A1 | 2/2007 | Barrette et al. |
| 2007/0045028 A1 | 3/2007 | Yamamoto et al. |
| 2007/0050095 A1 | 3/2007 | Nelson et al. |
| 2007/0050125 A1 | 3/2007 | Matsuda et al. |
| 2007/0068490 A1 | 3/2007 | Matsuda |
| 2007/0073461 A1 | 3/2007 | Fielder |
| 2007/0096672 A1 | 5/2007 | Endo et al. |
| 2007/0118268 A1 | 5/2007 | Inoue et al. |
| 2007/0119419 A1 | 5/2007 | Matsuda |
| 2007/0120332 A1 | 5/2007 | Bushko et al. |
| 2007/0126628 A1 | 6/2007 | Lalik et al. |
| 2007/0142167 A1 | 6/2007 | Kanafani et al. |
| 2007/0151544 A1 | 7/2007 | Arai et al. |
| 2007/0158920 A1 | 7/2007 | Delaney |
| 2007/0168125 A1 | 7/2007 | Petrik |
| 2007/0169744 A1 | 7/2007 | Maruo et al. |
| 2007/0178779 A1 | 8/2007 | Takada et al. |
| 2007/0192001 A1 | 8/2007 | Tatsumi et al. |
| 2007/0213920 A1 | 9/2007 | Igarashi et al. |
| 2007/0227796 A1 | 10/2007 | Simmons et al. |
| 2007/0239331 A1 | 10/2007 | Kaplan |
| 2007/0240917 A1 | 10/2007 | Duceppe |
| 2007/0244619 A1 | 10/2007 | Peterson |
| 2007/0246010 A1 | 10/2007 | Okuyama et al. |
| 2007/0247291 A1 | 10/2007 | Masuda et al. |
| 2007/0255462 A1 | 11/2007 | Masuda et al. |
| 2007/0255466 A1 | 11/2007 | Chiao |
| 2007/0260372 A1 | 11/2007 | Langer |
| 2007/0271026 A1 | 11/2007 | Hijikata |
| 2007/0294008 A1 | 12/2007 | Yasui et al. |
| 2008/0004773 A1 | 1/2008 | Maeda |
| 2008/0015767 A1 | 1/2008 | Masuda et al. |
| 2008/0022969 A1 | 1/2008 | Frenz et al. |
| 2008/0059034 A1 | 3/2008 | Lu |
| 2008/0078355 A1 | 4/2008 | Maehara et al. |
| 2008/0091309 A1 | 4/2008 | Walker |
| 2008/0114521 A1 | 5/2008 | Doering |
| 2008/0115761 A1 | 5/2008 | Deguchi et al. |
| 2008/0119984 A1 | 5/2008 | Hrovat et al. |
| 2008/0172155 A1 | 7/2008 | Takamatsu et al. |
| 2008/0178838 A1 | 7/2008 | Ota |
| 2008/0178839 A1 | 7/2008 | Oshima et al. |
| 2008/0178840 A1 | 7/2008 | Oshima et al. |
| 2008/0183353 A1 | 7/2008 | Post et al. |
| 2008/0243334 A1 | 10/2008 | Bujak et al. |
| 2008/0243336 A1 | 10/2008 | Fitzgibbons |
| 2008/0269989 A1 | 10/2008 | Brenner et al. |
| 2008/0275606 A1 | 11/2008 | Tarasinski et al. |
| 2008/0287256 A1 | 11/2008 | Unno |
| 2008/0300768 A1 | 12/2008 | Hijikata |
| 2009/0008890 A1 | 1/2009 | Woodford |
| 2009/0020966 A1 | 1/2009 | Germain |

(56) References Cited

U.S. PATENT DOCUMENTS

| | | |
|---|---|---|
| 2009/0037051 A1 | 2/2009 | Shimizu et al. |
| 2009/0071437 A1 | 3/2009 | Samoto et al. |
| 2009/0076699 A1 | 3/2009 | Osaki et al. |
| 2009/0093928 A1 | 4/2009 | Getman et al. |
| 2009/0095252 A1 | 4/2009 | Yamada |
| 2009/0095254 A1 | 4/2009 | Yamada |
| 2009/0096598 A1 | 4/2009 | Tengler et al. |
| 2009/0108546 A1 | 4/2009 | Ohletz et al. |
| 2009/0132154 A1 | 5/2009 | Fuwa et al. |
| 2009/0171546 A1 | 7/2009 | Tozuka et al. |
| 2009/0173562 A1 | 7/2009 | Namari et al. |
| 2009/0229568 A1 | 9/2009 | Nakagawa |
| 2009/0234534 A1 | 9/2009 | Stempnik et al. |
| 2009/0240427 A1 | 9/2009 | Siereveld et al. |
| 2009/0243339 A1 | 10/2009 | Orr et al. |
| 2009/0254249 A1 | 10/2009 | Ghoneim et al. |
| 2009/0254259 A1 | 10/2009 | The |
| 2009/0261542 A1 | 10/2009 | McIntyre |
| 2009/0287392 A1 | 11/2009 | Thomas |
| 2009/0301830 A1 | 12/2009 | Kinsman et al. |
| 2009/0308682 A1 | 12/2009 | Ripley et al. |
| 2009/0312147 A1 | 12/2009 | Oshima et al. |
| 2009/0321167 A1 | 12/2009 | Simmons |
| 2010/0012399 A1 | 1/2010 | Hansen |
| 2010/0016120 A1 | 1/2010 | Dickinson et al. |
| 2010/0017059 A1 | 1/2010 | Lu et al. |
| 2010/0017070 A1 | 1/2010 | Doering et al. |
| 2010/0023236 A1 | 1/2010 | Morgan et al. |
| 2010/0057297 A1 | 3/2010 | Itagaki et al. |
| 2010/0059964 A1 | 3/2010 | Morris |
| 2010/0109277 A1 | 5/2010 | Furrer |
| 2010/0113214 A1 | 5/2010 | Krueger et al. |
| 2010/0121529 A1 | 5/2010 | Savaresi et al. |
| 2010/0131131 A1 | 5/2010 | Kamio et al. |
| 2010/0138142 A1 | 6/2010 | Pease |
| 2010/0140009 A1 | 6/2010 | Kamen et al. |
| 2010/0145579 A1 | 6/2010 | O'Brien |
| 2010/0145581 A1 | 6/2010 | Hou |
| 2010/0145595 A1 | 6/2010 | Bellistri et al. |
| 2010/0152969 A1 | 6/2010 | Li et al. |
| 2010/0181416 A1 | 7/2010 | Sakamoto et al. |
| 2010/0191420 A1 | 7/2010 | Honma et al. |
| 2010/0203933 A1 | 8/2010 | Eyzaguirre et al. |
| 2010/0211261 A1 | 8/2010 | Sasaki et al. |
| 2010/0219004 A1 | 9/2010 | Mackenzie |
| 2010/0230876 A1 | 9/2010 | Inoue et al. |
| 2010/0238129 A1 | 9/2010 | Nakanishi et al. |
| 2010/0252972 A1 | 10/2010 | Cox et al. |
| 2010/0253018 A1 | 10/2010 | Peterson |
| 2010/0259018 A1 | 10/2010 | Honig et al. |
| 2010/0276906 A1 | 11/2010 | Galasso et al. |
| 2010/0282210 A1 | 11/2010 | Itagaki |
| 2010/0301571 A1 | 12/2010 | Van et al. |
| 2011/0022266 A1 | 1/2011 | Ippolito et al. |
| 2011/0025012 A1 | 2/2011 | Nakamura |
| 2011/0035089 A1 | 2/2011 | Hirao et al. |
| 2011/0035105 A1 | 2/2011 | Jolly |
| 2011/0036656 A1 | 2/2011 | Nicoson |
| 2011/0074123 A1 | 3/2011 | Fought et al. |
| 2011/0109060 A1 | 5/2011 | Earle et al. |
| 2011/0153158 A1 | 6/2011 | Acocella |
| 2011/0153174 A1 | 6/2011 | Roberge et al. |
| 2011/0166744 A1 | 7/2011 | Lu et al. |
| 2011/0186360 A1 | 8/2011 | Brehob et al. |
| 2011/0190972 A1 | 8/2011 | Timmons et al. |
| 2011/0215544 A1 | 9/2011 | Rhodig |
| 2011/0270509 A1 | 11/2011 | Whitney et al. |
| 2011/0297462 A1 | 12/2011 | Grajkowski et al. |
| 2011/0297463 A1 | 12/2011 | Grajkowski et al. |
| 2011/0301824 A1 | 12/2011 | Nelson et al. |
| 2011/0301825 A1 | 12/2011 | Grajkowski et al. |
| 2011/0307155 A1 | 12/2011 | Simard |
| 2012/0017871 A1 | 1/2012 | Matsuda |
| 2012/0018263 A1 | 1/2012 | Marking |
| 2012/0029770 A1 | 2/2012 | Hirao et al. |
| 2012/0053790 A1 | 3/2012 | Oikawa |
| 2012/0053791 A1 | 3/2012 | Harada |
| 2012/0055745 A1 | 3/2012 | Buettner et al. |
| 2012/0065860 A1 | 3/2012 | Isaji et al. |
| 2012/0078470 A1 | 3/2012 | Hirao et al. |
| 2012/0119454 A1 | 5/2012 | Di Maria |
| 2012/0136506 A1 | 5/2012 | Takeuchi et al. |
| 2012/0139328 A1 | 6/2012 | Brown et al. |
| 2012/0168268 A1 | 7/2012 | Bruno et al. |
| 2012/0191301 A1 | 7/2012 | Benyo et al. |
| 2012/0191302 A1 | 7/2012 | Sternecker et al. |
| 2012/0222908 A1 | 9/2012 | Mangum |
| 2012/0222927 A1 | 9/2012 | Marking |
| 2012/0247888 A1 | 10/2012 | Chikuma et al. |
| 2012/0253601 A1 | 10/2012 | Ichida et al. |
| 2012/0265402 A1 | 10/2012 | Post et al. |
| 2012/0277953 A1 | 11/2012 | Savaresi et al. |
| 2013/0009350 A1 | 1/2013 | Wolf-Monheim |
| 2013/0018559 A1 | 1/2013 | Epple et al. |
| 2013/0030650 A1 | 1/2013 | Norris et al. |
| 2013/0041545 A1 | 2/2013 | Baer et al. |
| 2013/0060423 A1 | 3/2013 | Jolly |
| 2013/0060444 A1 | 3/2013 | Matsunaga et al. |
| 2013/0074487 A1 | 3/2013 | Herold et al. |
| 2013/0079988 A1 | 3/2013 | Hirao et al. |
| 2013/0092468 A1 | 4/2013 | Nelson et al. |
| 2013/0096784 A1 | 4/2013 | Kohler et al. |
| 2013/0096785 A1 | 4/2013 | Kohler et al. |
| 2013/0096793 A1 | 4/2013 | Krosschell |
| 2013/0103259 A1 | 4/2013 | Eng et al. |
| 2013/0124045 A1 | 5/2013 | Suzuki et al. |
| 2013/0158799 A1 | 6/2013 | Kamimura |
| 2013/0161921 A1 | 6/2013 | Cheng et al. |
| 2013/0173119 A1 | 7/2013 | Izawa |
| 2013/0190980 A1 | 7/2013 | Ramirez Ruiz |
| 2013/0197732 A1 | 8/2013 | Pearlman et al. |
| 2013/0197756 A1 | 8/2013 | Ramirez Ruiz |
| 2013/0218414 A1 | 8/2013 | Meitinger et al. |
| 2013/0226405 A1 | 8/2013 | Koumura et al. |
| 2013/0253770 A1 | 9/2013 | Nishikawa et al. |
| 2013/0261893 A1 | 10/2013 | Yang |
| 2013/0304319 A1 | 11/2013 | Daniels |
| 2013/0328277 A1 | 12/2013 | Ryan et al. |
| 2013/0334394 A1 | 12/2013 | Parison et al. |
| 2013/0338869 A1 | 12/2013 | Tsumano |
| 2013/0341143 A1 | 12/2013 | Brown |
| 2013/0345933 A1 | 12/2013 | Norton et al. |
| 2014/0001717 A1 | 1/2014 | Giovanardi et al. |
| 2014/0005888 A1 | 1/2014 | Bose et al. |
| 2014/0012467 A1 | 1/2014 | Knox et al. |
| 2014/0038755 A1 | 2/2014 | Ijichi et al. |
| 2014/0046539 A1 | 2/2014 | Wijffels et al. |
| 2014/0058606 A1 | 2/2014 | Hilton |
| 2014/0095022 A1 | 4/2014 | Cashman et al. |
| 2014/0125018 A1 | 5/2014 | Brady et al. |
| 2014/0125027 A1 | 5/2014 | Rhodig |
| 2014/0129083 A1 | 5/2014 | O'Connor et al. |
| 2014/0131971 A1 | 5/2014 | Hou |
| 2014/0136048 A1 | 5/2014 | Ummethala et al. |
| 2014/0156143 A1 | 6/2014 | Evangelou et al. |
| 2014/0167372 A1 | 6/2014 | Kim et al. |
| 2014/0232082 A1 | 8/2014 | Oshita et al. |
| 2014/0239602 A1 | 8/2014 | Blankenship et al. |
| 2014/0316653 A1 | 10/2014 | Kikuchi et al. |
| 2014/0353933 A1 | 12/2014 | Hawksworth et al. |
| 2014/0353934 A1* | 12/2014 | Yabumoto ............ B60G 17/018 280/5.515 |
| 2014/0358373 A1 | 12/2014 | Kikuchi et al. |
| 2015/0039199 A1 | 2/2015 | Kikuchi |
| 2015/0046034 A1 | 2/2015 | Kikuchi |
| 2015/0057885 A1 | 2/2015 | Brady et al. |
| 2015/0081170 A1 | 3/2015 | Kikuchi |
| 2015/0081171 A1 | 3/2015 | Ericksen et al. |
| 2015/0084290 A1 | 3/2015 | Norton et al. |
| 2015/0091269 A1 | 4/2015 | Yleva |
| 2015/0108732 A1 | 4/2015 | Luttinen et al. |
| 2015/0217778 A1 | 8/2015 | Fairgrieve et al. |
| 2015/0329141 A1 | 11/2015 | Preijert |

(56) References Cited

U.S. PATENT DOCUMENTS

| | | | |
|---|---|---|---|
| 2015/0352920 A1* | 12/2015 | Lakehal-Ayat | B60G 17/0182 701/38 |
| 2016/0059660 A1 | 3/2016 | Brady et al. | |
| 2016/0082802 A1 | 3/2016 | Izak | |
| 2016/0107498 A1 | 4/2016 | Yamazaki | |
| 2016/0121689 A1 | 5/2016 | Park et al. | |
| 2016/0121905 A1 | 5/2016 | Gillingham et al. | |
| 2016/0121924 A1 | 5/2016 | Norstad | |
| 2016/0153516 A1 | 6/2016 | Marking | |
| 2016/0200164 A1 | 7/2016 | Tabata et al. | |
| 2016/0214455 A1 | 7/2016 | Reul et al. | |
| 2016/0236528 A1 | 8/2016 | Sunahiro | |
| 2016/0280331 A1 | 9/2016 | Mangum | |
| 2016/0347137 A1 | 12/2016 | Despres-Nadeau et al. | |
| 2016/0347142 A1 | 12/2016 | Seong et al. | |
| 2017/0008363 A1 | 1/2017 | Ericksen et al. | |
| 2017/0043778 A1 | 2/2017 | Kelly | |
| 2017/0087950 A1 | 3/2017 | Brady et al. | |
| 2017/0129298 A1 | 5/2017 | Lu et al. | |
| 2017/0129301 A1 | 5/2017 | Harvey | |
| 2017/0129390 A1 | 5/2017 | Akaza et al. | |
| 2017/0313152 A1 | 11/2017 | Kang | |
| 2017/0321729 A1 | 11/2017 | Melcher | |
| 2018/0001729 A1 | 1/2018 | Goffer et al. | |
| 2018/0009443 A1 | 1/2018 | Norstad | |
| 2018/0126817 A1 | 5/2018 | Russell et al. | |
| 2018/0141543 A1 | 5/2018 | Krosschell et al. | |
| 2018/0264902 A1 | 9/2018 | Schroeder et al. | |
| 2018/0265062 A1 | 9/2018 | Bowers et al. | |
| 2018/0297435 A1 | 10/2018 | Brady et al. | |
| 2018/0339566 A1 | 11/2018 | Ericksen et al. | |
| 2018/0354336 A1 | 12/2018 | Oakden-Graus et al. | |
| 2018/0361853 A1 | 12/2018 | Grajkowski et al. | |
| 2019/0100071 A1 | 4/2019 | Tsiaras et al. | |
| 2019/0118604 A1 | 4/2019 | Suplin et al. | |
| 2019/0118898 A1 | 4/2019 | Ericksen et al. | |
| 2019/0217894 A1 | 7/2019 | Upah et al. | |
| 2019/0389478 A1 | 12/2019 | Norstad | |
| 2020/0016953 A1 | 1/2020 | Oakden-Graus et al. | |
| 2020/0096075 A1 | 3/2020 | Lindblad | |
| 2020/0156430 A1 | 5/2020 | Oakden-Graus et al. | |
| 2020/0223279 A1 | 7/2020 | McKeefery | |
| 2020/0238781 A1 | 7/2020 | Hadi | |
| 2020/0269648 A1 | 8/2020 | Halper | |
| 2020/0282786 A1 | 9/2020 | Lorenz et al. | |
| 2021/0031579 A1 | 2/2021 | Booth et al. | |
| 2021/0031713 A1 | 2/2021 | Kotrla et al. | |
| 2021/0070124 A1 | 3/2021 | Brady et al. | |
| 2021/0070125 A1 | 3/2021 | Brady et al. | |
| 2021/0070126 A1 | 3/2021 | Brady et al. | |
| 2021/0086578 A1 | 3/2021 | Brady et al. | |
| 2021/0088100 A1 | 3/2021 | Woelfel | |
| 2021/0102596 A1 | 4/2021 | Malmborg et al. | |
| 2021/0108696 A1 | 4/2021 | Connor | |
| 2021/0162830 A1 | 6/2021 | Graus et al. | |
| 2021/0162833 A1 | 6/2021 | Graus et al. | |
| 2021/0206263 A1 | 7/2021 | Grajkowski et al. | |
| 2021/0229519 A1 | 7/2021 | Tsiaras et al. | |
| 2021/0268860 A1 | 9/2021 | Randall | |
| 2021/0300140 A1 | 9/2021 | Ericksen et al. | |
| 2021/0300141 A1 | 9/2021 | De Grammont et al. | |
| 2021/0316716 A1 | 10/2021 | Krosschell et al. | |
| 2021/0362806 A1 | 11/2021 | Hedlund et al. | |
| 2021/0379957 A1 | 12/2021 | Tabata et al. | |
| 2021/0402837 A1 | 12/2021 | Azuma | |
| 2022/0009304 A1 | 1/2022 | Leclerc | |
| 2022/0016949 A1 | 1/2022 | Graus et al. | |
| 2022/0032708 A1 | 2/2022 | Tabata et al. | |
| 2022/0041029 A1 | 2/2022 | Randall et al. | |
| 2022/0056976 A1 | 2/2022 | Anderson | |
| 2022/0080796 A1 | 3/2022 | Dong et al. | |
| 2022/0088988 A1 | 3/2022 | Menden et al. | |
| 2022/0134830 A1 | 5/2022 | Voelkel et al. | |
| 2022/0227191 A1 | 7/2022 | Dong et al. | |
| 2022/0266844 A1 | 8/2022 | Norstad et al. | |
| 2022/0288990 A1 | 9/2022 | Smith | |
| 2022/0324282 A1 | 10/2022 | Brady et al. | |
| 2022/0332159 A1 | 10/2022 | Corsico | |
| 2022/0388362 A1 | 12/2022 | Graus et al. | |
| 2022/0397194 A1 | 12/2022 | Kohler et al. | |
| 2023/0013665 A1 | 1/2023 | Gagnon et al. | |
| 2023/0079941 A1 | 3/2023 | Graus et al. | |
| 2024/0123972 A1 | 4/2024 | Krosschell et al. | |
| 2024/0131892 A1 | 4/2024 | Graus et al. | |
| 2024/0262151 A1 | 8/2024 | Graus et al. | |

FOREIGN PATENT DOCUMENTS

| | | |
|---|---|---|
| CA | 2260292 A1 | 7/2000 |
| CA | 2851626 A1 | 4/2013 |
| CA | 2963790 A1 | 4/2016 |
| CA | 2965309 A1 | 5/2016 |
| CA | 3018906 A1 | 4/2019 |
| CN | 1129646 A | 8/1996 |
| CN | 2255379 Y | 6/1997 |
| CN | 2544987 Y | 4/2003 |
| CN | 2564394 | 8/2003 |
| CN | 1660615 A | 8/2005 |
| CN | 1664337 A | 9/2005 |
| CN | 1746803 A | 3/2006 |
| CN | 1749048 A | 3/2006 |
| CN | 1810530 A | 8/2006 |
| CN | 101088829 | 12/2007 |
| CN | 101417596 A | 4/2009 |
| CN | 101522444 A | 9/2009 |
| CN | 101549626 A | 10/2009 |
| CN | 201380733 | 1/2010 |
| CN | 101868363 A | 10/2010 |
| CN | 201723635 U | 1/2011 |
| CN | 102015338 | 4/2011 |
| CN | 102069813 A | 5/2011 |
| CN | 102168732 A | 8/2011 |
| CN | 201914049 U | 8/2011 |
| CN | 202040257 U | 11/2011 |
| CN | 102616104 A | 8/2012 |
| CN | 102627063 A | 8/2012 |
| CN | 102678808 A | 9/2012 |
| CN | 202449059 U | 9/2012 |
| CN | 102729760 A | 10/2012 |
| CN | 202468817 U | 10/2012 |
| CN | 102840265 A | 12/2012 |
| CN | 102887044 | 1/2013 |
| CN | 103038487 | 4/2013 |
| CN | 103079934 A | 5/2013 |
| CN | 103213470 | 7/2013 |
| CN | 103303088 A | 9/2013 |
| CN | 103318184 A | 9/2013 |
| CN | 103507588 A | 1/2014 |
| CN | 104755348 A | 7/2015 |
| CN | 104768782 A | 7/2015 |
| CN | 105564437 A | 5/2016 |
| CN | 106183688 A | 12/2016 |
| CN | 106218343 A | 12/2016 |
| CN | 106794736 A | 5/2017 |
| CN | 103857576 B | 8/2017 |
| CN | 107406094 A | 11/2017 |
| CN | 107521449 A | 12/2017 |
| CN | 107521499 A | 12/2017 |
| CN | 109203900 A | 1/2019 |
| CN | 110121438 A | 8/2019 |
| CN | 110691705 A | 1/2020 |
| DE | 3705520 A1 | 9/1988 |
| DE | 3811541 A1 | 10/1988 |
| DE | 4017255 A1 | 12/1990 |
| DE | 4323589 A1 | 1/1994 |
| DE | 4328551 A1 | 3/1994 |
| DE | 19508302 A1 | 9/1996 |
| DE | 19922745 A1 | 12/2000 |
| DE | 60029553 T2 | 7/2007 |
| DE | 102010020544 A1 | 1/2011 |
| DE | 102012101278 A1 | 8/2013 |
| EP | 0361726 A2 | 4/1990 |
| EP | 0398804 A1 | 11/1990 |
| EP | 0403803 A1 | 12/1990 |

(56) References Cited

FOREIGN PATENT DOCUMENTS

| | | |
|---|---|---|
| EP | 0544108 A1 | 6/1993 |
| EP | 0546295 A1 | 6/1993 |
| EP | 0405123 | 10/1993 |
| EP | 0473766 | 2/1994 |
| EP | 0691226 A1 | 1/1996 |
| EP | 0745965 A1 | 12/1996 |
| EP | 0829383 A2 | 3/1998 |
| EP | 0953470 A2 | 11/1999 |
| EP | 1005006 A2 | 5/2000 |
| EP | 1022169 A2 | 7/2000 |
| EP | 1172239 A2 | 1/2002 |
| EP | 1219475 A1 | 7/2002 |
| EP | 1238833 A1 | 9/2002 |
| EP | 1258706 A2 | 11/2002 |
| EP | 1355209 A1 | 10/2003 |
| EP | 1449688 A2 | 8/2004 |
| EP | 1481876 A1 | 12/2004 |
| EP | 1164897 | 2/2005 |
| EP | 2123933 A2 | 11/2009 |
| EP | 2216191 A1 | 8/2010 |
| EP | 2268496 A1 | 1/2011 |
| EP | 2397349 A1 | 12/2011 |
| EP | 2517904 A1 | 10/2012 |
| EP | 3150454 A1 | 4/2017 |
| EP | 3204248 A1 | 8/2017 |
| EP | 3461663 A1 | 4/2019 |
| FR | 2935642 | 3/2010 |
| GB | 2233939 A | 1/1991 |
| GB | 2234211 A | 1/1991 |
| GB | 2259063 A | 3/1993 |
| GB | 2262491 A | 6/1993 |
| GB | 2329728 A | 3/1999 |
| GB | 2377415 A | 1/2003 |
| GB | 2412448 A | 9/2005 |
| GB | 2441348 A | 3/2008 |
| GB | 2445291 A | 7/2008 |
| GB | 2552237 A | 1/2018 |
| IN | 20130233813 | 8/2014 |
| JP | 01-208212 | 8/1989 |
| JP | 02-155815 A | 6/1990 |
| JP | 03-137209 A | 6/1991 |
| JP | 04-368211 A | 12/1992 |
| JP | 05-178055 A | 7/1993 |
| JP | 06-156036 A | 6/1994 |
| JP | 07-117433 A | 5/1995 |
| JP | 07-186668 A | 7/1995 |
| JP | 08-332940 A | 12/1996 |
| JP | 09-203640 A | 8/1997 |
| JP | 2898949 B2 | 6/1999 |
| JP | 2956221 B2 | 10/1999 |
| JP | 11-321754 A | 11/1999 |
| JP | 3087539 B2 | 9/2000 |
| JP | 2001-018623 A | 1/2001 |
| JP | 3137209 B2 | 2/2001 |
| JP | 2001-121939 A | 5/2001 |
| JP | 2001-233228 A | 8/2001 |
| JP | 2001-278089 A | 10/2001 |
| JP | 2002-219921 A | 8/2002 |
| JP | 2003-328406 A | 11/2003 |
| JP | 2008-273246 A | 11/2008 |
| JP | 2009-035220 A | 2/2009 |
| JP | 2009-160964 A | 7/2009 |
| JP | 4584510 B2 | 11/2010 |
| JP | 2011-126405 A | 6/2011 |
| JP | 5149443 B2 | 2/2013 |
| JP | 2013-173490 A | 9/2013 |
| JP | 2013-189109 A | 9/2013 |
| KR | 10-2008-0090833 A | 10/2008 |
| TW | M299089 U | 10/2006 |
| WO | 92/10693 A1 | 6/1992 |
| WO | 96/05975 A1 | 2/1996 |
| WO | 97/27388 A1 | 7/1997 |
| WO | 99/59860 A1 | 11/1999 |
| WO | 00/53057 A1 | 9/2000 |
| WO | 02/20318 A1 | 3/2002 |
| WO | 2004/009433 A1 | 1/2004 |
| WO | 2004/098941 A1 | 11/2004 |
| WO | 2009/008816 A1 | 1/2009 |
| WO | 2009/133000 A1 | 11/2009 |
| WO | 2012/028923 A1 | 3/2012 |
| WO | 2015/004676 A1 | 1/2015 |
| WO | 2016/057555 A1 | 4/2016 |
| WO | 2016/069405 A2 | 5/2016 |
| WO | 2018/189712 A1 | 10/2018 |
| WO | 2020/089837 A1 | 5/2020 |

OTHER PUBLICATIONS

Unno et al.; Development of Electronically Controlled DVT Focusing on Rider's Intention of Acceleration and Deceleration; SAE International; Oct. 30, 2007.

Written Opinion issued by the International Searching Authority, dated Jun. 7, 2018, for related International Patent Application No. PCT/US2017/062303; 22 pages.

International Preliminary Report on Patentability received for PCT Patent Application No. PCT/US2021/042230, mailed on Jan. 26, 2023, 10 pages.

3Drive Compact Throttle Controller, Blitz Power USA, <http://pivotjp.com/product/thf_c/the.html>; earliest known archive via Internet Archive Wayback Machine Aug. 27, 2009; <http://web.archive.org/web/20090827154111/http://pivotjp.com/product/thf_c/the.html>; see appended screenshot retrieved from the Internet Nov. 30, 2015; 2 pages.

Ackermann et al., "Robust steering control for active rollover avoidance of vehicles with elevated center of gravity", Jul. 1998, pp. 1-6.

Article 34 Amendment, issued by the European Patent Office, dated Aug. 29, 2016, for related International patent application No. PCT/US2015/057132; 34 pages.

Bhattacharyya et al., "An Approach to Rollover Stability in Vehicles Using Suspension Relative Position Sensors and Lateral Acceleration Sensors", Dec. 2005, 100 pages.

Compare: Three Selectable Terrain Management Systems, Independent Land Rover News Blog, retrieved from https://web.archive.org/web/20120611082023/ . . . ; archive date Jun. 11, 2012; 4 pages.

EDFC Active Adjust Damping Force Instantly according to G-Force & Speed, Tein, retrieved from https://web.archive.org/web/20160515190809/ . . . ; archive date May 15, 2016; 22 pages.

English translation of Examination Report issued by the State Intellectual Property Office of People's Republic of China, dated Jun. 1, 2015, for Chinese Patent Application No. 201180037804.3; 13 pages.

European Search Report issued by the European Patent Office, dated Feb. 10, 2017, for corresponding European patent application No. 16193006; 7 pages.

Examination Report issued by the European Patent Office, dated Aug. 1, 2016, for European Patent Application No. 11724931.8; 5 pages.

Examination Report issued by the State Intellectual Property Office of People's Republic of China, dated Feb. 3, 2016, for Chinese Patent Application No. 201180037804.3; 14 pages.

Examination Report No. 1 issued by the Australian Government IP Australia, dated Apr. 15, 2014, for Australian Patent Application No. 2011261248; 5 pages.

Examination Report No. 1 issued by the Australian Government IP Australia, dated Aug. 10, 2018, for Australian Patent Application No. 2015328248; 2 pages.

Examination Report No. 1 issued by the Australian Government IP Australia, dated Jan. 12, 2017, for corresponding Australian patent application No. 2015271880; 6 pages.

Examination Report No. 2 issued by the Australian Government IP Australia, dated Jun. 29, 2017, for Australian Patent Application No. 2015271880; 8 pages.

Examination Report No. 2 issued by the Australian Government IP Australia, dated May 29, 2015, for Australian Patent Application No. 2011261248; 8 pages.

(56) References Cited

OTHER PUBLICATIONS

Examination Report No. 3 issued by the Australian Government IP Australia, dated Dec. 1, 2017, for Australian Patent Application No. 2015271880; 7 pages.
Extended European Search Report issued by the European Patent Office, dated Sep. 7, 2018, for European Patent Application No. 18183050.6; 7 pages.
First drive: Ferrari's easy-drive supercar, GoAuto.com.au, Feb. 16, 2010; 4 pages.
Gangadurai et al.; Development of control strategy for optimal control of a continuously variable transmission operating in combination with a throttle controlled engine; SAE International; Oct. 12, 2005.
Hac et al., "Improvements in vehicle handling through integrated control of chassis systems", Int. J. of Vehicle Autonomous Systems(IJVAS), vol. 1, No. 1, 2002, pp. 83-110.
Huang et al., "Nonlinear Active Suspension Control Design Applied to a Half-Car Model", Proceedings of the 2004 IEEE International Conference on Networking, Mar. 21-23, 2004, pp. 719-724.
Ingalls, Jake; Facebook post https://www.facebook.com/groups/877984048905836/permalink/110447996625624-2; Sep. 11, 2016; 1 page.
International Preliminary Amendment issued by The International Bureau of WIPO, dated May 21, 2019, for International Patent Application No. PCT/US2017/062303; 22 pages.
International Preliminary Report on Patentability in PCT Application Serial No. PCT/US15/57132, issued Jan. 30, 2017 (6 pages).
International Preliminary Report on Patentability issued by the European Patent Office, dated Apr. 11, 2017, for International Patent Application No. PCT/US2015/054296; 7 pages.
International Preliminary Report on Patentability issued by the International Bureau of WIPO, dated Dec. 10, 2019, for International Patent Application No. PCT/US2018/036383; 8 pages.
International Preliminary Report on Patentability issued by the International Bureau of WIPO, dated May 12, 2015, for International Application No. PCT/US2013/068937; 7 pages.
International Preliminary Report on Patentability issued by The International Bureau of WIPO, Dec. 4, 2012, for International Application No. PCT/US2011/039165; 9 pages.
International Preliminary Report on Patentability issued by the International Searching Authority, dated Jun. 3, 2021, or International Patent Application No. PCT/IB2019/060089; 21 pages.
International Preliminary Report on Patentability received for PCT Patent Application No. PCT/US2017/062303, mailed on May 31, 2019, 23 pages.
International Preliminary Report on Patentability received for PCT Patent Application No. PCT/US2021/033199, mailed on Dec. 1, 2022, 11 pages.
International Search Report and Written Opinion of the International Searching Authority for International Application No. PCT/US2011/39165, dated Jan. 3, 2012; 15 pages.
International Search Report and Written Opinion of the International Searching Authority, dated Aug. 31, 2018, for International Patent Application No. PCT/US2018/036383; 12 pages.
International Search Report and Written Opinion received for PCT Patent Application No. PCT/IB2019/060089, mailed on May 29, 2020, 24 pages.
International Search Report and Written Opinion received for PCT Patent Application No. PCT/US2013/068937, mailed on Feb. 26, 2014, 10 pages.
International Search Report and Written Opinion received for PCT Patent Application No. PCT/US2015/054296, mailed on Dec. 18, 2015, 9 pages.
International Search Report and Written Opinion received for PCT Patent Application No. PCT/US2015/057132, mailed on May 13, 2016, 17 pages.
International Search Report and Written Opinion received for PCT Patent Application No. PCT/US2021/033199, mailed on Aug. 23, 2021, 14 pages.
International Search Report and Written Opinion received for PCT Patent Application No. PCT/US2021/042230, mailed on Dec. 17, 2021, 4 pages.
International Search Report issued by the International Searching Authority, dated Jun. 7, 2018, for related International Patent Application No. PCT/US2017/062303; 7 pages.
Machine translation of DE 3705520 A1 from espacenet.com Nov. 2022.
McKay et al., Delphi Electronic Throttle Control Systems for Model Year 2000; Driver Features, System Security, and OEM Benefits. ETC for the Mass Market, Electronic Engine Controls 2000: Controls (SP-1500), SAE 2000 World Congress, Detroit, MI, Mar. 6-9, 2000, 13 pages.
Office Action issued by the Canadian Intellectual Property Office, dated Apr. 21, 2017, for corresponding Canadian patent application No. 2,801,334; 3 pages.
Office Action issued by the Canadian Intellectual Property Office, dated Jul. 26, 2019, for Canadian Patent Application No. 2,963,790; 3 pages.
Office Action issued by the Canadian Intellectual Property Office, dated Jun. 22, 2021, for Canadian Patent Application No. 3,043,481; 3 pages.
Office Action issued by the Canadian Intellectual Property Office, dated May 10, 2021, for Canadian Patent Application No. 2,890,996; 3 pages.
Office Action issued by the Canadian Intellectual Property Office, dated Oct. 1, 2019, for Canadian Patent Application No. 2,965,309; 8 pages.
Office Action issued by the Mexican Patent Office, dated Jun. 25, 2014, for corresponding Mexican patent application No. MX/a/2012/014069; 2 pages.
Scott Tsuneishi, "2005 Subaru WRX Sti—Blitz Throttle Controller," Oct. 1, 2008, Super Street Online, <http://www.superstreetonline.com/how-to/engine/turp-0810-2005-subam-wrx-sti-blitz-throttle-controller>; see appended screenshot retrived from the Internet Nov. 30, 2015; 11 pages.
Throttle Controller, Blitz Power USA, <http://www.blitzpowerusa.com/products/throcon/throcon.html>.; earliest known archive via Internet Archive Wayback Machine Sep. 14, 2009: <http://web.archive.Org/web/20090914102957/http://www.blitzpowerusa.com/products/throcon/throcon.html>.; see appended screenshot.
"Chinese Application Serial No. 202211674164.3, Office Action mailed Mar. 29, 2025", With English Machine Translation, 19 pgs.

\* cited by examiner

SYSTEM AND METHOD FOR CONTROLLING A VEHICLE

CROSS-REFERENCE TO RELATED APPLICATIONS

The present application is a continuation of U.S. patent application Ser. No. 17/685,779, filed Mar. 3, 2022, which is a continuation of U.S. patent application Ser. No. 16/455,846, filed Jun. 28, 2019, now U.S. Pat. No. 11,285,964, issued Jun. 28, 2019, which is a continuation of U.S. patent application Ser. No. 15/687,484, filed Aug. 27, 2017, now U.S. Pat. No. 10,363,941, issued Jul. 30, 2019, which is a divisional of U.S. patent application Ser. No. 14/928,121, filed Oct. 30, 2015, now U.S. Pat. No. 9,771,084, issued Sep. 26, 2017, which claims priority to U.S. Provisional Patent Application No. 62/073,724, filed Oct. 31, 2014; the subject matter of which are incorporated herein by reference.

FIELD OF THE DISCLOSURE

The present disclosure relates to a vehicle and more particularly to control strategies for recreational and utility vehicles.

BACKGROUND AND SUMMARY

Some recreational vehicles, such as all-terrain vehicles (ATV's), utility vehicles, motorcycles, etc., include a power steering system. Electronic power steering systems often use a detected ground speed to determine the level of steering torque assist to provide to the steering assembly. In these systems, the power steering will not function properly when ground speed data is faulty or unavailable. In addition, the calibration of a power steering unit may drift over time, resulting in a steering offset bias.

The stability of recreational vehicles may be assessed by stability tests, such as a static (KST) stability test, a rollover resistance rating (RRR) test, and a J-Turn test. Many recreational vehicles lack an active stability control system.

In an exemplary embodiment of the present disclosure, a vehicle is provided including an electronic power steering system, an electronic throttle control system, and a stability control system.

More particularly in a first embodiment, a power steering method for a vehicle is disclosed, where the method includes detecting, by a controller of a power steering system, a speed of an engine of the vehicle; determining, by the controller, a power steering assist level based on the engine speed; and outputting, by the power steering system, steering torque assistance to a steering assembly of the vehicle based on the power steering assist level.

In another embodiment, a power steering method for a vehicle includes detecting, by a controller of a power steering system, an error with a ground speed feedback signal; changing, by the controller, a power steering assist control mode from a first control mode to a second control mode in response to detecting the error with the ground speed feedback signal, wherein in the first control mode the controller determines a power steering assist level based on the ground speed feedback signal and in the second control mode the controller determines the power steering assist level based on at least one of a throttle valve opening, a detected engine speed, and a predetermined fixed ground speed; and outputting, by the power steering system, steering torque assistance to a steering assembly of the vehicle based on the power steering assist level.

In another embodiment, a power steering method for a vehicle includes detecting, by a controller of a power steering system, a selected gear of a transmission of the vehicle; determining, by the controller, a power steering assist level based on the selected gear of the transmission and a user torque input to a steering assembly of the vehicle; and outputting, by the power steering system, steering torque assistance to the steering assembly of the vehicle based on the power steering assist level.

In another embodiment, a power steering system for a vehicle, includes a steering assembly including a steering shaft; a sensor operative to detect a speed of an engine of the vehicle; and a power steering unit including a controller in communication with a motor, the motor being operably coupled to the steering shaft, the controller including control logic operative to determine a power steering assist level based on the engine speed, the controller controlling the motor to output steering torque assistance to the steering shaft based on the power steering assist level.

In another embodiment, a method for controlling a power steering system of a vehicle including: detecting, by a controller of the power steering system, a trigger event; in response to detecting the trigger event, determining, by the controller, a torque offset of the power steering system; and in response to the torque offset exceeding a threshold for each of a plurality of occurrences of the trigger event, determining, by the controller, a torque offset correction value; and controlling, by the controller, a steering torque assistance applied by the power steering system to a steering assembly of the vehicle based on the torque offset correction value.

In yet another embodiment, a recreational vehicle includes a chassis; an engine supported by the chassis; a ground engaging member; a steering assembly operably coupled to the ground engaging member; a power steering system including a steering shaft, a power steering unit, and a controller in communication with the power steering unit; and a torque sensor in communication with the controller, the controller being operative to detect a trigger event, in response to the detection of the trigger event, determine a torque offset of the power steering system based on output from the torque sensor, in response to the torque offset of the steering shaft exceeding a threshold for each of a plurality of occurrences of the trigger event, determine a torque offset correction value, and control a steering torque assistance applied by the power steering system to the steering assembly based on the torque offset correction value.

BRIEF DESCRIPTION OF THE DRAWINGS

Corresponding reference characters indicate corresponding parts throughout the several views. The exemplification set out herein illustrates embodiments of the invention, and such exemplifications are not to be construed as limiting the scope of the invention in any manner.

DETAILED DESCRIPTION OF THE DRAWINGS

The embodiments disclosed herein are not intended to be exhaustive or limit the disclosure to the precise forms disclosed in the following detailed description. Rather, the embodiments are chosen and described so that others skilled in the art may utilize their teachings.

The term "logic" or "control logic" as used herein may include software and/or firmware executing on one or more programmable processors, application-specific integrated circuits (ASICs), field-programmable gate arrays (FPGAs), digital signal processors (DSPs), hardwired logic, or combinations thereof. Therefore, in accordance with the embodiments, various logic may be implemented in any appropriate fashion and would remain in accordance with the embodiments herein disclosed.

Figure 1:
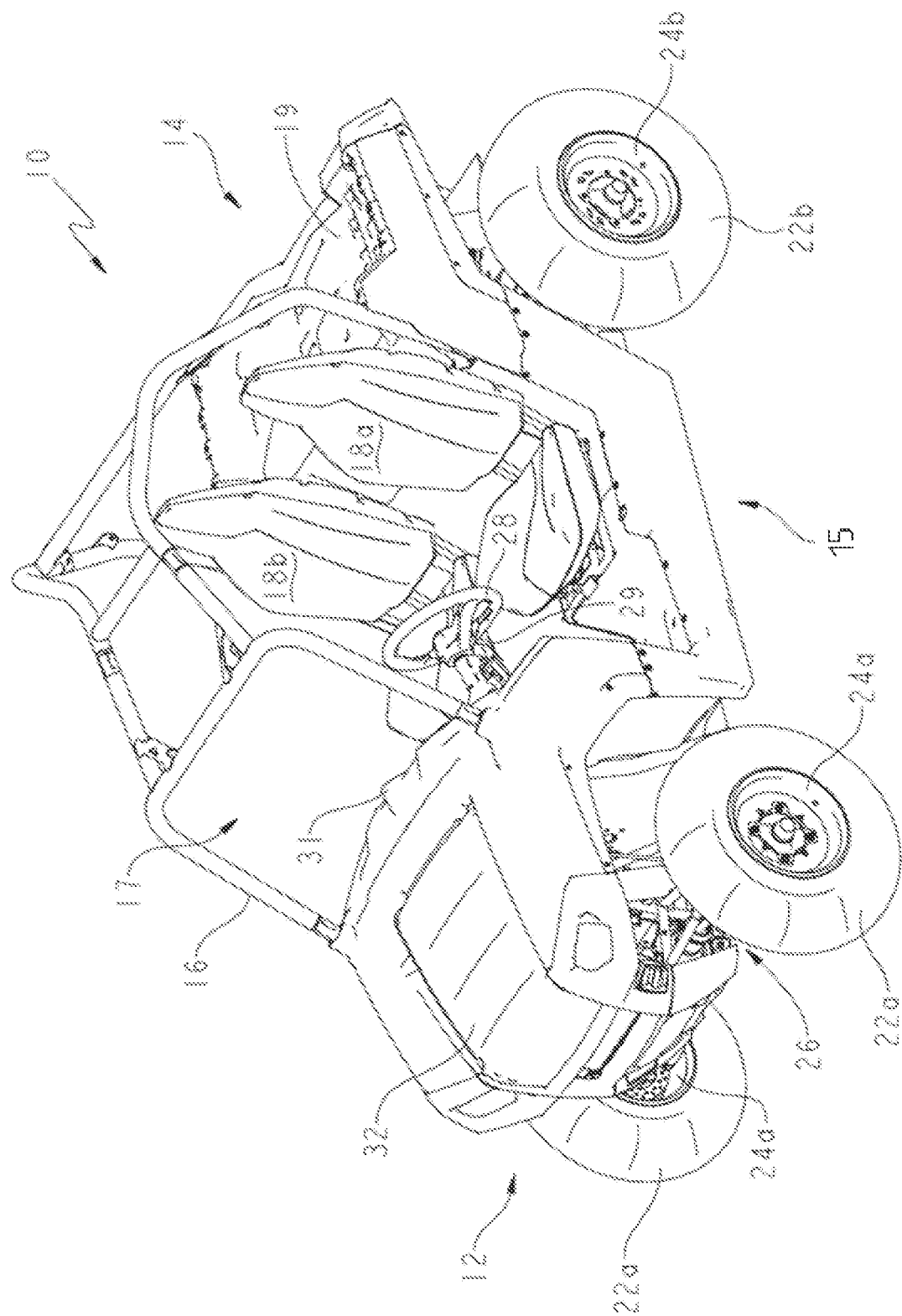
FIG. 1 is a perspective view of an exemplary vehicle incorporating the control strategies of the present disclosure.

Referring initially to FIG. 1, an exemplary vehicle 10 is illustrated that implements the control strategies disclosed herein. Vehicle 10 is illustratively a side-by-side ATV 10 including a front end 12, a rear end 14, and a frame or chassis 15 that is supported above the ground surface by a pair of front tires 22a and wheels 24a and a pair of rear tires 22b and wheels 24b. Vehicle 10 includes a pair of laterally spaced-apart bucket seats 18a, 18b, although a bench style seat or any other style of seating structure may be used. Seats 18a, 18b are positioned within a cab 17 of vehicle 10. A protective cage 16 extends over cab 17 to reduce the likelihood of injury to passengers of vehicle 10 from passing branches or tree limbs and to act as a support in the event of a vehicle rollover. Cab 17 also includes front dashboard 31, adjustable steering wheel 28, and shift lever 29. Front dashboard 31 may include a tachometer, speedometer, a display, or any other suitable instrument.

Front end 12 of vehicle 10 includes a hood 32 and a front suspension assembly 26. Front suspension assembly 26 pivotally couples front wheels 24a to vehicle 10. Rear end 14 of vehicle 10 includes an engine cover 19 which extends over an engine 130 and transmission assembly 122 (see FIG. 2). Rear end 14 further includes a rear suspension assembly (not shown) pivotally coupling rear wheels 24b to vehicle 10. Other suitable vehicles may be provided, such as a snowmobile, a straddle-seat vehicle, a utility vehicle, a motorcycle, and other recreational and non-recreational vehicles.

Figure 2:
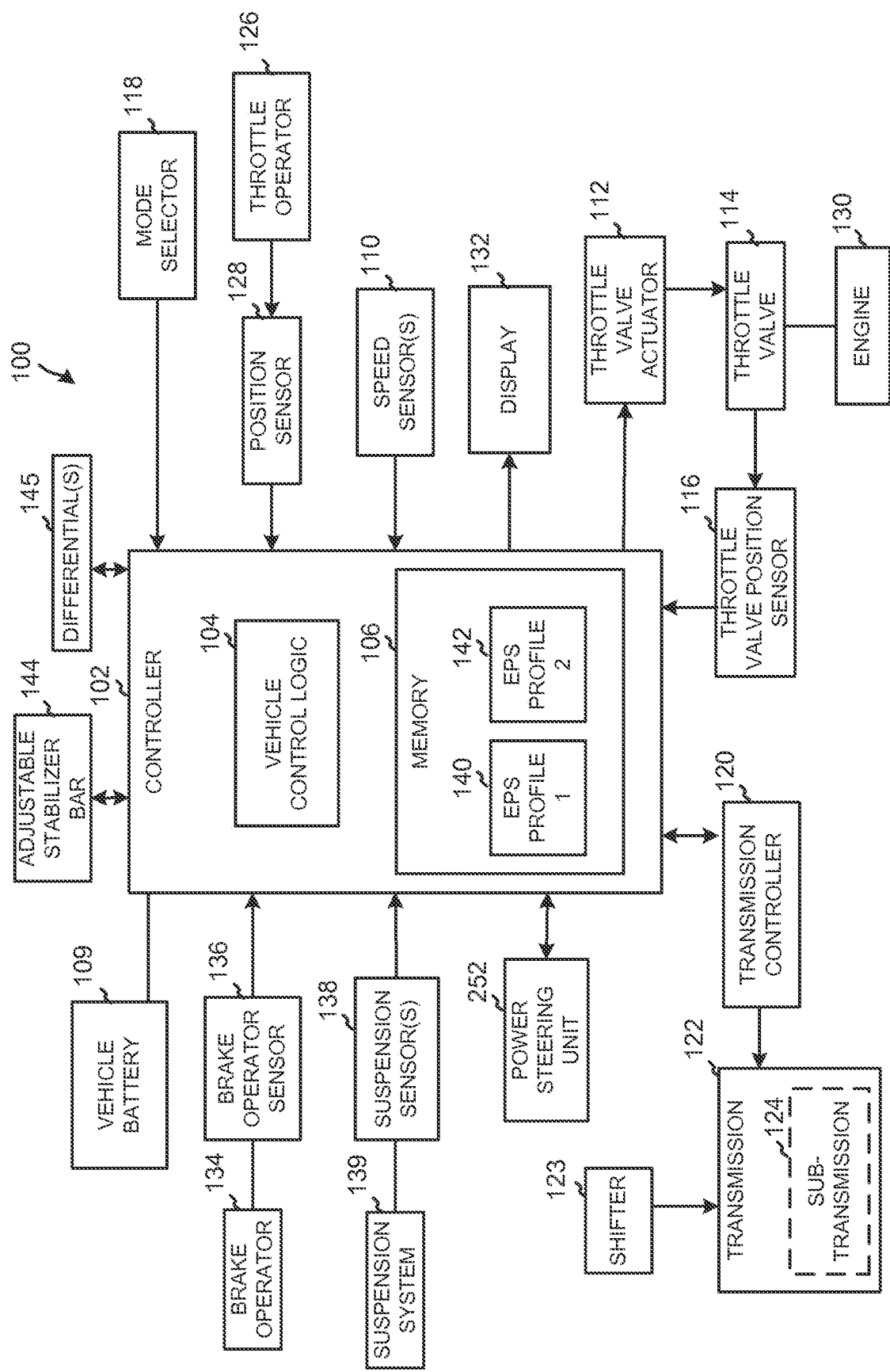
FIG. 2 is a representative view of an exemplary control system of the vehicle of FIG. 1 including a vehicle and engine controller, a transmission controller, and a power steering unit.

Referring to FIG. 2, an exemplary control system 100 of vehicle 10 is illustrated. Control system 100 includes a controller 102, such as a vehicle control module and/or an engine control module, having vehicle control logic 104 that controls the engine 130, various subsystems, and electrical components of vehicle 10. Controller 102 includes one or more processors that execute software and/or firmware code stored in an internal or external memory 106 of controller 102. The software/firmware code contains instructions that, when executed by the one or more processors of controller 102, causes controller 102 to perform the functions described herein. Controller 102 may alternatively include one or more application-specific integrated circuits (ASICs), field-programmable gate arrays (FPGAs), digital signal processors (DSPs), hardwired logic, or combinations thereof. Controller 102 may include one or more physical control modules.

Memory 106 is any suitable computer readable medium that is accessible by the processor(s) of controller 102. Memory 106 may be a single storage device or multiple storage devices, may be located internally or externally to controller 102, and may include both volatile and non-volatile media. Exemplary memory 106 includes random-access memory (RAM), read-only memory (ROM), electrically erasable programmable ROM (EEPROM), flash memory, CD-ROM, Digital Versatile Disk (DVD) or other optical disk storage, a magnetic storage device, or any other suitable medium which is configured to store data and which is accessible by controller 102.

Control system 100 further includes at least one vehicle battery 109 (e.g., 12 VDC) for providing power to the electrical components of control system 100, such as controller 102, sensors, switches, lighting, ignition, accessory outlets, and other powered components. One or more speed sensors 110 provide speed feedback to controller 102, such as the engine speed, vehicle speed, PTO shaft speed, or other drive line speeds. For example, sensors 110 may include an engine RPM sensor, a wheel speed sensor, a transmission speed sensor, and/or other suitable speed sensors. A brake operator sensor 136 detects a position of a brake operator 134 and/or an applied pressure to brake operator 134 of vehicle 10. Brake operator 134 may include a pedal, a hand brake, or another suitable operator input device that, when actuated by an operator, is configured to provide an operator brake demand to controller 102.

Controller 102 is operative to output an electrical signal to a throttle valve actuator 112 to control a position or opening of a throttle valve 114 of engine 130. Controller 102 electronically controls the position of throttle valve 114 of engine 130 based on the detected position of a throttle operator 126 to regulate air intake to and thus the speed of engine 130. Throttle operator 126 may include an accelerator pedal, a thumb actuated lever, a twist grip, or any other suitable operator input device that, when actuated by an operator, is configured to provide an operator throttle demand to controller 102. A throttle operator position sensor 128 coupled to and in communication with controller 102 provides signal feedback to controller 102 indicative of the position of a throttle operator 126. A throttle valve position sensor 116 provides feedback to controller 102 indicative of the actual position or degree of opening of throttle valve 114. For additional disclosure of electronic throttle control provided with controller 102, see U.S. patent application Ser. No. 13/152,981, filed Jun. 3, 2011, entitled ELECTRONIC THROTTLE CONTROL, the entire disclosure of which is expressly incorporated by reference herein. In an alternative embodiment, vehicle 10 is an electric vehicle or hybrid-electric vehicle and includes one or more electric motors for powering the vehicle, and throttle operator 126 provides a torque demand to controller 102 for controlling the electric motor(s).

Control system 100 further includes a power steering assist unit (EPAS) 252 in communication with controller 102. In the illustrated embodiment, power steering unit 252 includes an electronic power steering unit 252 operative to provide steering assist to the steering assembly of vehicle 10, as described herein.

Vehicle 10 further includes a transmission controller 120 in communication with controller 102 that is operative to control a transmission 122 of vehicle 10. Transmission controller 120 includes one or more processors that execute software and/or firmware code stored in an internal or external memory of transmission controller 120. The software/firmware code contains instructions that, when executed by the one or more processors of controller 120, causes controller 120 to perform transmission control functions.

In one embodiment, transmission 122 is an electronically controlled continuously variable transmission (CVT). In this embodiment, transmission 122 further includes a sub-transmission 124 coupled to an output of the CVT 122. In one embodiment, sub-transmission 124 is geared to provide a high gear (high range), a neutral gear, a low gear (low range), a reverse gear, and a park configuration for vehicle 10 of FIG. 1. Fewer or additional gears may be provided with sub-transmission 124. See, for example, the exemplary continuously variable transmission and sub-transmission disclosed in U.S. patent application Ser. No. 13/652,253, filed Oct. 15, 2012, entitled PRIMARY CLUTCH ELECTRONIC CVT, the entire disclosure of which is expressly incorporated by reference herein. Alternatively, transmission 122 may include any other suitable transmission types, such as a discrete ratio transmission, automatic or manual transmission, hydrostatic transmission, etc. One or more shifters 123 operated by an operator are configured to select a transmission gear of transmission 122 and/or sub-transmission 124.

One or more suspension sensors 138 provide feedback to controller 102 indicative of a suspension height or displacement (e.g., compression or extension) of the vehicle suspension system 139. For example, suspension sensors 138 may include shock position sensors and/or spring position sensors providing position feedback of the shock absorbers and springs or other suspension components of vehicle 10. In one embodiment, suspension sensors 138 are positioned internal to shocks of suspension system 139 or mounted to control arms of system 139. In one embodiment, a display 132 is coupled to controller 102 for displaying vehicle operation information to an operator. Exemplary information provided on display 132 includes vehicle speed, engine speed, fuel level, clutch position or gear ratio, selected transmission mode (e.g., auto, manual, hydrostatic), a selected terrain mode (e.g., pavement, ice/snow, gravel, rock, etc.), transmission gear, etc. In one embodiment, controller 102 communicates with one or more sensors/devices of vehicle 10 and/or other vehicle controllers via controller area network (CAN) communication.

Figure 3:
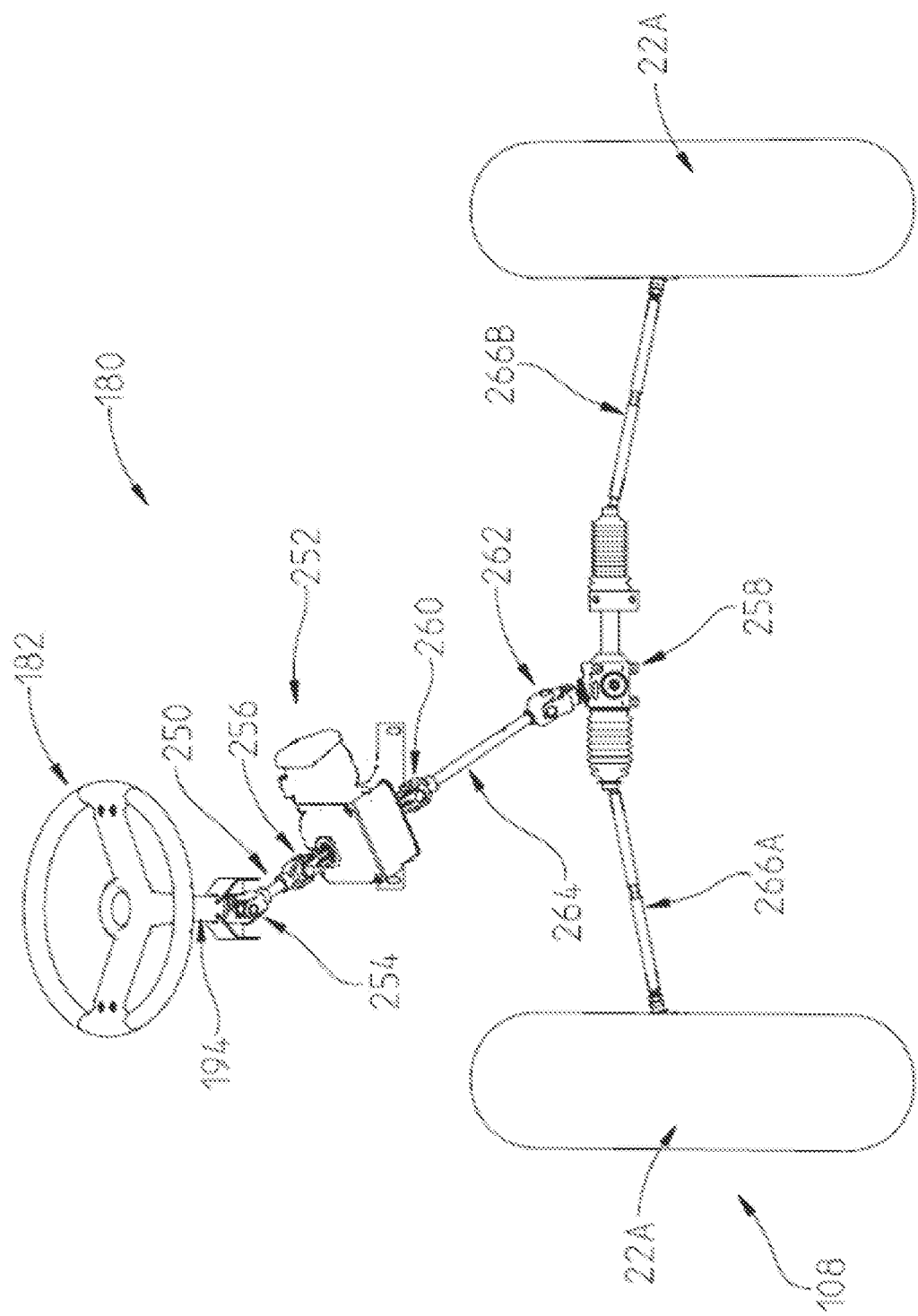
FIG. 3 illustrates an electrical power steering unit incorporated into a steering assembly of the vehicle of FIG. 1.

Referring to FIG. 3, an exemplary steering assembly 180 and exemplary power steering assist unit 252 of vehicle 10 of FIG. 1 is illustrated. Steering assembly 180 includes a steering wheel 182 coupled to a steering column 194. Other suitable operator steering devices may be provided. Steering column 194 is in turn coupled to power steering unit 252 through a steering shaft 250 coupled to steering column 194 at a first U-joint 254 and coupled to power steering unit 252 at a second U-joint 256. Power steering unit 252 is coupled to a steering rack 258 through a third U-joint 260 and a fourth U-joint 262 with a steering shaft 264 disposed therebetween. In another embodiment, third u-joint 260, fourth u-joint 262, and steering shaft 264 are omitted such that power steering unit 252 is coupled directly to steering rack 258.

Steering rack 258 is coupled to ground engaging members 22a of a front axle 108 of vehicle 10 through steering rods 266A and 266B, respectively. The steering rods 266A, 266B are coupled to respective steering posts provided on a respective wheel carrier of wheels 24a (FIG. 1). The movement of steering wheel 182 causes movement of the steering rods 266A, 266B, and this movement of the steering rods 266A, 266B is transferred to the respective wheel carrier to rotate about an axis to turn ground engaging members 22a. For additional detail of an exemplary steering assembly, see U.S. application Ser. No. 12/135,107, filed Jun. 6, 2008, entitled VEHICLE, the entire disclosure of which is expressly incorporated by reference herein.

Figure 4:
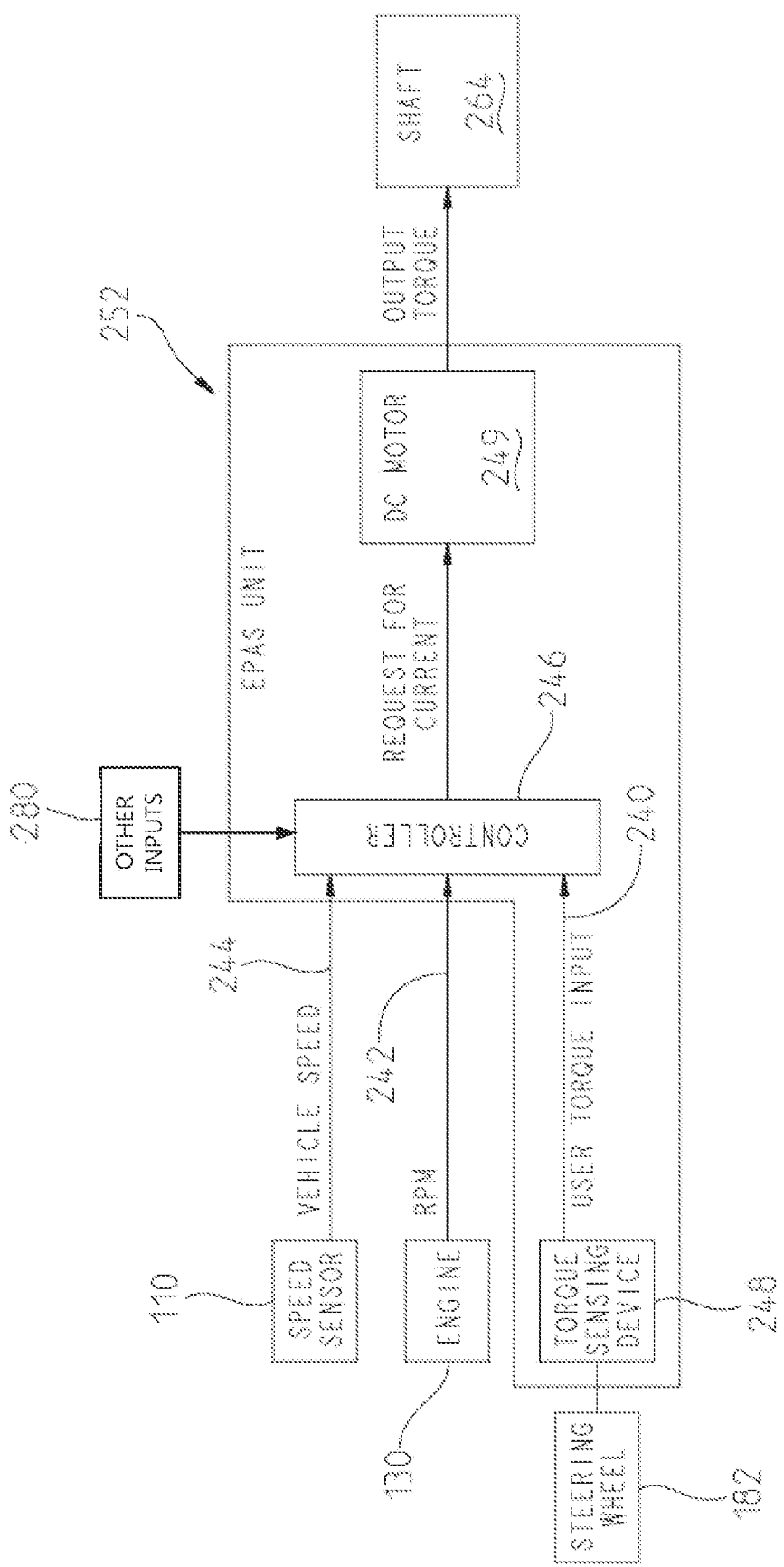
FIG. 4 is a representative view of the power steering unit of FIG. 2.

In the illustrated embodiment, power steering unit 252 is an electric power steering unit that receives power from the electrical system of vehicle 10. In one embodiment, power steering unit 252 is programmable to account for different vehicle conditions and/or operator preferences. Referring to FIG. 4, an exemplary embodiment of a power steering unit 252 includes a controller 246 and a motor 249, illustratively a direct current (DC) motor 249. Controller 246 includes one or more processors that execute software and/or firmware code stored in an internal or external memory to perform the power steering operations described herein. Controller 246 receives a user torque input 240 from the vehicle operator (through shaft 250 of FIG. 3), a revolutions per minute (rpm) input 242 from the power source (engine 130 or electric motor), and a vehicle speed input 244 from a speed sensor 110. Inputs 240, 242, and/or 244 may include CAN bus signals or discrete signals, such as frequency or pulse input signals or analog voltage signals. Controller 246 provides a current signal to electric motor 249 based on inputs 240, 242, 244. Shaft 264 is mechanically coupled to shaft 250 (FIG. 3) through power steering unit 252. Motor 249 is also coupled to steering shaft 264 through a gear set and provides assistance to rotate steering shaft 264 in addition to the force applied through shaft 250 by the operator.

The user torque input 240 is generated by turning steering wheel 182 and is measured by a torque sensing device 248 which is illustratively housed within power steering unit 252. Torque sensing device 248 measures the angular displacement between two shafts connected by a torsional element (e.g., one of the shafts responsive to the movement of steering shaft 250 or being the steering shaft 250). The angular displacement is converted to a torque value. The torque value is received by controller 246 and is used by controller 246 to determine an amount of assist which power steering unit 252 should provide through motor 249 and the direction in which the assist needs to be supplied (left turn or right turn). The vehicle speed input 244 is also used to vary the amount of assist provided by power steering unit 252 depending on the speed of vehicle 10.

In one embodiment, controller 246 receives additional inputs 280 (e.g., maximum RPM, maximum ground speed, transmission gear, etc.) used for calculating the level of the steering torque assist, as described herein. In one embodiment, controller 246 is in communication with controller 102 of FIG. 2 (which is illustratively external to power steering unit 252) to obtain speed profiles and additional inputs 280. For example, memory 106 of controller 102 may include one or more electronic power steering (EPS) speed profiles 140, 142 (see FIG. 2) which define the amount of current to motor 249 of power steering unit 252 based on vehicle speed, user torque input, and other variables to vary the torque assistance level provided to steering shaft 264. In one example, the speed profile 140, 142 has distinct constant assist levels based on vehicle speed and user torque input 240. In another example, the assist levels of the speed profiles 140, 142 vary over a range of vehicle speeds. In one embodiment, the RPM input 242 provides an indication of whether engine 130 is running or not running. Controller 246 may enable or disable the steering torque assist based on whether engine 130 is running.

In one embodiment, a first speed profile 140 of FIG. 2 provides that at speeds below a threshold speed power steering unit 252 provides a first amount of steering effort and assist to steering shaft 264 and at speeds above the threshold speed power steering unit 252 provides a second amount of steering effort and assist to steering shaft 264, the second amount being lower than the first amount. In one example, the second amount is no assist. In one embodiment, the amount of assist varies over a range of speeds (e.g., proportionally or otherwise) and is not limited to two discrete speeds.

Figure 5:
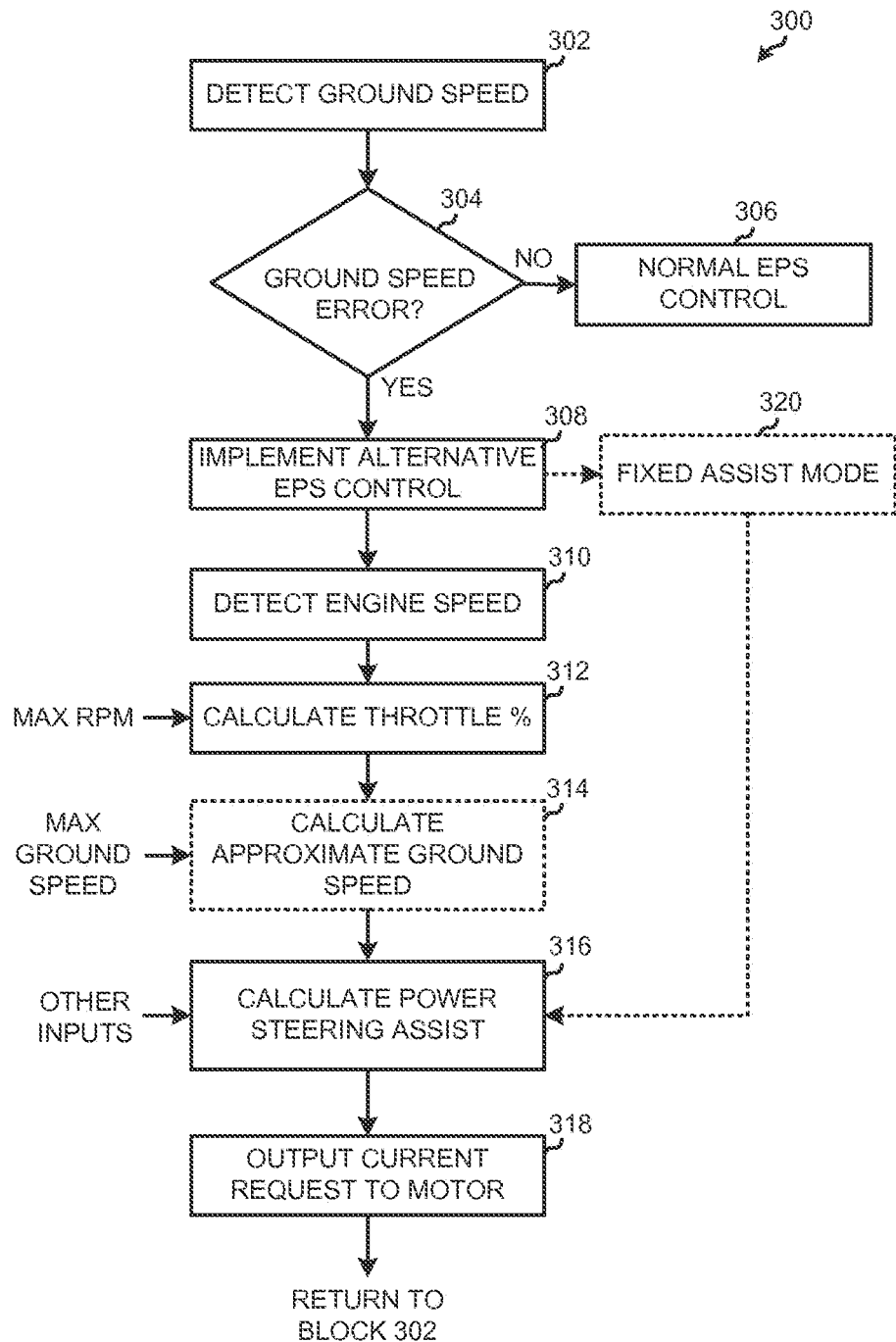
FIG. 5 is a block diagram illustrating an exemplary method for calculating a level of power steering assist according to some embodiments.

FIG. 5 is a flow diagram 300 illustrating an exemplary operation performed by power steering controller 246 (or vehicle controller 102) for determining a level of steering torque assistance provided by power steering unit 252 to shaft 264 when vehicle speed feedback 244 is faulty or unavailable due to, for example, sensor error or other fault. Reference is made to FIGS. 2-4 throughout the description of FIG. 5.

At block 302, controller 246 detects the vehicle ground speed based on feedback 244 from vehicle speed sensor 110. At block 304, controller 246 determines whether the ground speed feedback 244 has an error. For example, a ground speed error may include the detected ground speed having an erroneous value or a value that exceeds the capability of the vehicle, the detected ground speed changing at a rate that exceeds a threshold rate (for example, a threshold rate that corresponds to a maximum possible change in vehicle speed of vehicle 10), or controller 246 failing to detect a ground speed. If controller 246 does not detect a ground speed signal error, controller 246 performs normal power steering control at block 306 based on the detected ground speed, speed maps, and/or other suitable inputs, as described above. If controller 246 detects a ground speed signal error at block 304, controller 246 proceeds to block 308 to implement an alternative power steering assist control scheme to determine the applied amount of power steering assistance using inputs other than detected ground speed. In the illustrated embodiment, controller 246 implements the alternative power steering assist control scheme illustrated in blocks 310-318.

At block 310, controller 246 detects the engine speed (RPM) of engine 130 based on sensor output. At block 312, controller 246 calculates an approximate throttle valve 114 opening percentage based on the detected engine speed and a maximum engine speed value stored in memory, based on the following Equation (1):

$$\text{Percentage Full Throttle} = \text{(Detected RPM)}/\text{(Max. RPM)} \quad (1)$$

In one embodiment, controller 246 optionally calculates an approximate ground speed of vehicle 10 at block 314 based on the detected engine speed, the preset maximum engine speed value, and a preset maximum ground speed value of vehicle 10, based on the following Equation (2):

$$\text{Approx. Ground Speed} = [\text{(Detected RPM)}/\text{(Max. RPM)}] \times \text{(Max. Ground Speed)} \quad (2)$$

At block 316, controller 246 calculates the level of power steering torque assist to apply to shaft 264. In one embodiment, controller 246 calculates the steering torque assist level based on the estimated throttle valve 114 opening percentage determined with Equation (1) and the user torque input 240 detected with torque sensing device 248. For example, for a greater estimated throttle opening, the torque assist level may be reduced for a same user torque input 240, and for a lesser estimated throttle opening, the torque assist level may be increased for the same user torque input 240. The torque assist level for a given user torque input 240 may have several discrete levels based on multiple throttle opening percentage thresholds or may be proportional to the throttle opening percentage threshold. In one embodiment, utilizing an estimated throttle opening based on engine speed with Equation (1), rather than utilizing an unfiltered, actual throttle opening detected with throttle valve position sensor 116 (FIG. 2), provides for smoother adjustment to the steering assist level by controller 246 as a result of the engine speed changing less rapidly than corresponding changes in the throttle opening. As such, in this embodiment, the torque assist level is configured to change less rapidly or abruptly than if the torque assist level was based on the unfiltered, actual throttle opening percentage detected with position sensor 116.

Alternatively, controller 246 may calculate the power steering torque assist level based on filtered throttle valve position data. In this embodiment, a smoothing or averaging filter is applied to the throttle valve position feedback output by throttle valve position sensor 116 (FIG. 2) to reduce the likelihood that rapid or abrupt changes in the throttle valve position result in rapid or abrupt changes to the level of steering torque assist, thereby providing a smooth transition between levels of steering torque assist as the throttle opening changes. The filter may include logic in controller 246 operative to smooth or average the output signal from position sensor 116.

In another embodiment, controller 246 calculates the steering torque assist level based on the estimated ground speed determined with Equation (2) and the user torque input 240 detected with torque sensing device 248. In this embodiment, controller 246 may use the estimated ground speed to determine the steering torque assist level based on the speed profiles, such as speed profiles 140, 142 described herein. In some embodiments, a predetermined offset is subtracted from the estimated ground speed from Equation (2) to account for potential errors or inaccuracies in the ground speed calculation, and the resulting adjusted estimated ground speed is used by controller 246 to determine the steering torque assist level. In some embodiments, controller 246 may use filtered actual throttle valve position data, as described above, instead of the estimated throttle opening percentage to estimate the ground speed in block 314, i.e., the maximum ground speed multiplied by the filtered (e.g., averaged or smoothed) actual throttle opening percentage.

At block 318, controller 246 outputs a current request to motor 249 to output steering torque to shaft 264 at the steering torque assist level calculated at block 316.

In one embodiment, controller 246 provides zero steering torque assist above a certain threshold, such as above a particular throttle opening percentage threshold or above an estimated ground speed threshold. In one embodiment, controller 246 provides larger or full steering torque assist below a particular throttle opening percentage threshold or below an estimated ground speed threshold.

In one embodiment, the maximum engine speed value considered at blocks 312 and 314 represents the theoretical maximum speed that engine 130 is capable of achieving, and the maximum ground speed value considered at block 314 represents the theoretical maximum ground speed that vehicle 10 is capable of achieving. In one embodiment, the maximum engine speed, maximum ground speed, and other predefined calibration values of FIG. 5 are stored in a calibration file stored in controller 246 or that is communicated by controller 102 to power steering controller 246. The calibration file may further include the speed profiles 140, 142.

In some embodiments, controller 246 uses additional calibration values or inputs to further refine the steering torque assist level calculated at block 316. For example, in some embodiments controller 246 further uses a selected gear of the transmission 122, as described herein. In some embodiments, controller 246 further uses an engagement speed of a clutch of a CVT transmission 122 (FIG. 2) to determine the steering torque assist. For example, a delay may occur from when the engine speed first increases from idle speed to when the CVT transmission 122 engages the CVT belt and causes the vehicle to move. In particular, the CVT sheaves engage the belt at a threshold engine speed (i.e., an engagement RPM) to transfer torque to the wheels. Torque is not applied to the wheels over the low engine speed range between engine idle speed and the threshold engagement engine speed. An exemplary engine idle speed is 1200 RPM, and an exemplary threshold engine speed is 3000 to 3500 RPM, although other suitable idle and engagement engine speeds may be provided depending on vehicle configuration. In some embodiments, steering torque assist is delayed or reduced by controller 246 until the threshold engine speed is reached and the transmission 122 engages the belt to rotate the wheels and move the vehicle.

Controller 246 may use other suitable variables or constants to determine the steering torque assist. For example, controller 246 may adjust the steering assist based on the driveline condition of the vehicle, including the transmission gear, the number of wheels driven by the engine, and the state of the differential(s) 145 (FIG. 2), i.e., open, locked, or controlled slip state. For example, the vehicle may include a first driveline configuration wherein the engine drives two wheels 24b of the vehicle 10 (i.e., 2WD) and a second driveline configuration where the engine drives all four wheels 24a, 24b (FIG. 1) of the vehicle 10 (4WD). In one embodiment, controller 246 applies more steering torque assist in the 4WD configuration than in the 2WD configuration for a given user torque input. In one embodiment, controller 246 applies more steering torque assist in the locked differential configuration than in the open differential configuration for a given user torque input.

In some embodiments, controller 246 further receives at block 316 of FIG. 5 an input indicative of a gear selection of transmission 122 of FIG. 2. The transmission gear may be detected via CAN bus, proximity sensor, mechanical switch, operator input device, or other suitable detection mechanisms. In this embodiment, controller 246 adjusts the level of the power steering torque assist at block 316 of FIG. 5 based on the selected transmission gear. The selected transmission gear may be the gear ratio of a discrete gear ratio transmission, a gear ratio of a CVT transmission, and/or a gear ratio of a sub-transmission. For example, in one embodiment sub-transmission 124 includes a low-range gear and a high-range gear. The low range gear provides increased power and lower speed operation than the high range gear. For example, the low range gear may be used for towing, plowing, rock crawling, hauling, or other work operations, and the high range gear may be used for traveling at higher speeds or in non-loaded conditions. In the illustrated embodiment, controller 246 provides increased levels of steering torque assist in the low-range gear and reduced levels of steering torque assist in the high range gear of sub-transmission 124.

Figure 6:
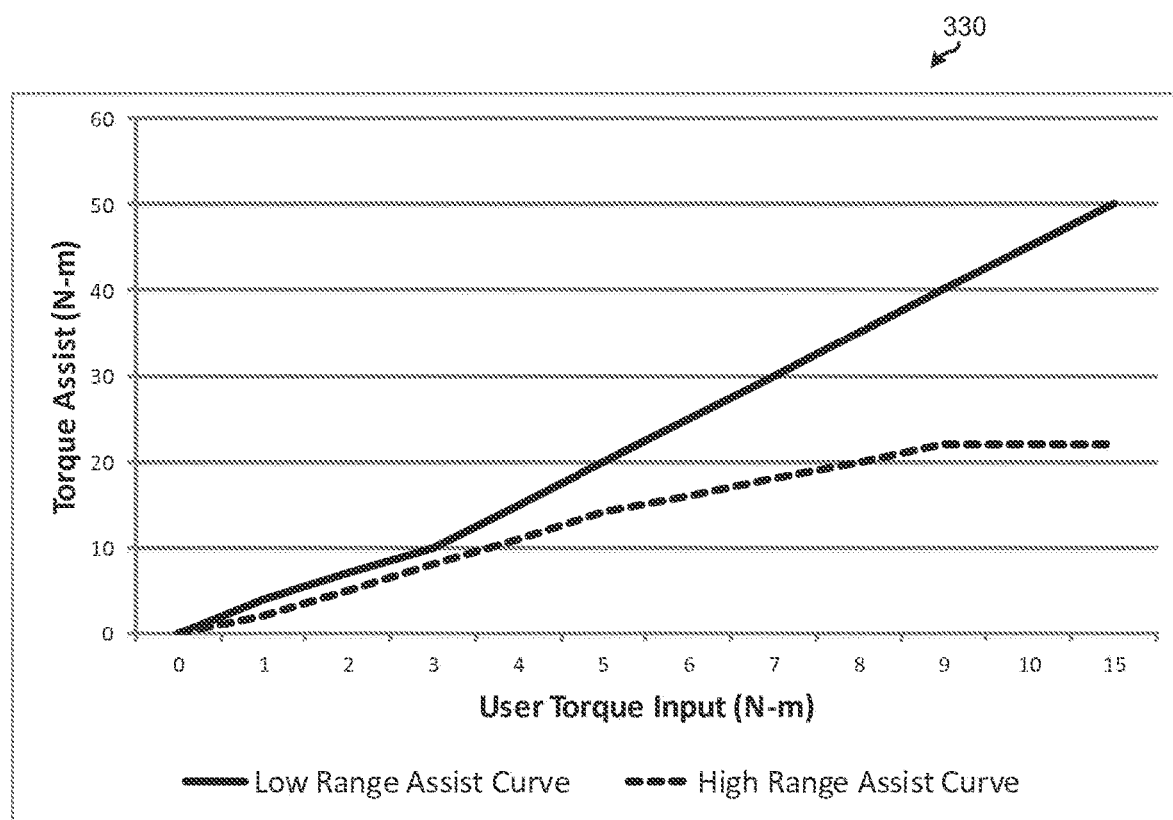
FIG. 6 is an exemplary graph illustrating power steering assist levels based on input steering torque and vehicle speed for low-range and high-range transmission gears.

FIG. 6 illustrates a graphical representation 330 of an exemplary torque assist level mapping for low- and high-range gears of sub-transmission 124 for a given estimated ground speed (Equation (2) described above) and/or a given estimated throttle opening percentage (Equation (1) described above). The x-axis represents the level of user torque input 240 (FIG. 4), and the y-axis represents the level of steering torque assist output by power steering unit 252, each represented in units of Newton meters (N-m). In the illustrated embodiment, more torque assist is provided in the low-range gear at the given ground speed than in the high-range gear at the given ground speed across the range of user torque input. In one embodiment, a torque assist curve, such as the curve of FIG. 6, is stored in memory of power steering unit 252 for each of a plurality of ground speeds and/or throttle opening percentages. The torque assist curves may also be received from controller 102 in a calibration file.

In one embodiment, vehicle 10 further includes an adjustable stabilizer bar 144 coupled to the front steering assembly, as illustrated in FIG. 2. Stabilizer bar 144 includes an actuator controlled by controller 102 (or controller 246 of FIG. 4) for variable adjustment. In one embodiment, the engagement/disengagement and the stiffness of the stabilizer bar 144 is controlled and adjusted by controller 102. The state of stabilizer bar 144 is communicated by controller 102 to power steering controller 246. In one embodiment, power steering controller 246 applies more steering assist when stabilizer bar 144 is disengaged and/or at low stiffness levels than when stabilizer bar 144 is engaged and/or at high stiffness levels. In one embodiment, the level of power steering assist may be inversely proportional (linearly or at multiple discrete levels) to the level of stiffness of stabilizer bar 144.

Referring again to FIG. 5, in another embodiment controller 246 implements a fixed assist mode at block 320 as the alternative power steering control scheme of block 308. In this embodiment, when the ground speed error is detected at block 304 of FIG. 5, controller 246 applies a steering torque assist curve that corresponds to a preselected fixed vehicle speed. For example, controller 246 applies steering torque assist based on a stored torque assist curve for a particular ground speed, such as 30 mph or any other suitable ground speed. Accordingly, the steering torque assist level varies according to the user torque input 240 and the assist curve corresponding to the selected fixed ground speed. The steering torque assist level in the fixed assist mode of block 320 may vary further based on other inputs, such as the driveline condition, transmission clutch engagement speed, and/or stabilizer bar configuration described herein.

Controller 246 of power steering unit 252 is further operative to execute a self-diagnosis to determine whether a torque bias or offset has drifted from a factory programmed offset (i.e., from a reference calibration). The factory programmed offset may be initially zero or any other suitable torque offset. The factory programmed offset is configured to zero or align the steering system when no external forces are applied to the steering system, such as, for example, a user steering torque input or a force applied to the wheel by an external object. In one embodiment, the torque offset is determined based on a sensed position of a shaft of the steering unit 252 relative to a reference position. For example, the offset may be determined via a torque or position sensor based on a rotational position of an input shaft of power steering unit 252 relative to an output shaft of power steering unit 252. In one embodiment, the torque offset is determined based on a detected change in the location of the torque sensor on the power steering system, e.g., on a steering shaft. Controller 246 is operative to perform an operation to automatically detect and correct a drifted torque offset, as described below.

The calibration of the power steering unit 252 may become inaccurate, for example, due to an impact to a shaft of the unit 252 or steering assembly or due to other conditions. In some conditions, a drifted offset bias of the power steering unit 252 may result in a left or right steering bias wherein the unit 252 improperly applies greater torque assist in one turning direction than in another turning direction. As an example, a 10 Newton meter (Nm) offset bias in power steering unit 252 may cause up to a 10% bias to the controlled output torque assist level.

In the illustrated embodiment, controller 246 performs a self-check at each ignition cycle of vehicle 10 and therefore at each power-up of unit 252. Vehicle 10 is normally "at-rest" at power-up in that the steering assembly normally has no external forces applied to it. For example, the user input torque via steering wheel 182 (FIG. 3) and other external steering forces are zero in most at-rest conditions. Controller 246 detects the input torque using torque sensing device 248 (FIG. 4), as described herein. In one embodiment, the input torque is determined by the angular displacement (i.e., offset) between two steering shafts of steering assembly 180 (FIG. 3), such as the input steering shaft 250 and output steering shaft 264 of FIG. 3. Other suitable methods of determining input torque may be provided. The input torque is positive for one steering direction and negative for the opposite steering direction.

If a detected input torque or angular difference is outside a tolerance range stored in memory at vehicle power-up, the device records the deviation in non-volatile memory, as described herein. The tolerance range may include, for example, a lower limit of −2 Nm torque difference and an upper limit of +2 Nm torque difference from the expected zero offset in the at-rest condition, although any suitable tolerance range may be provided. After a predetermined number of ignition cycles where the detected input torque or angular displacement is out of range, controller 246 applies incremental or gradual correction factors at subsequent power up events until the unit 252 reaches a point when the monitored angular difference is within the tolerance window or range at startup. Controller 246 may log data at every startup or only on startups when the parameter(s) are out of range. The self-check sequence may be stored as code in memory accessible by controller 246.

Figure 7:
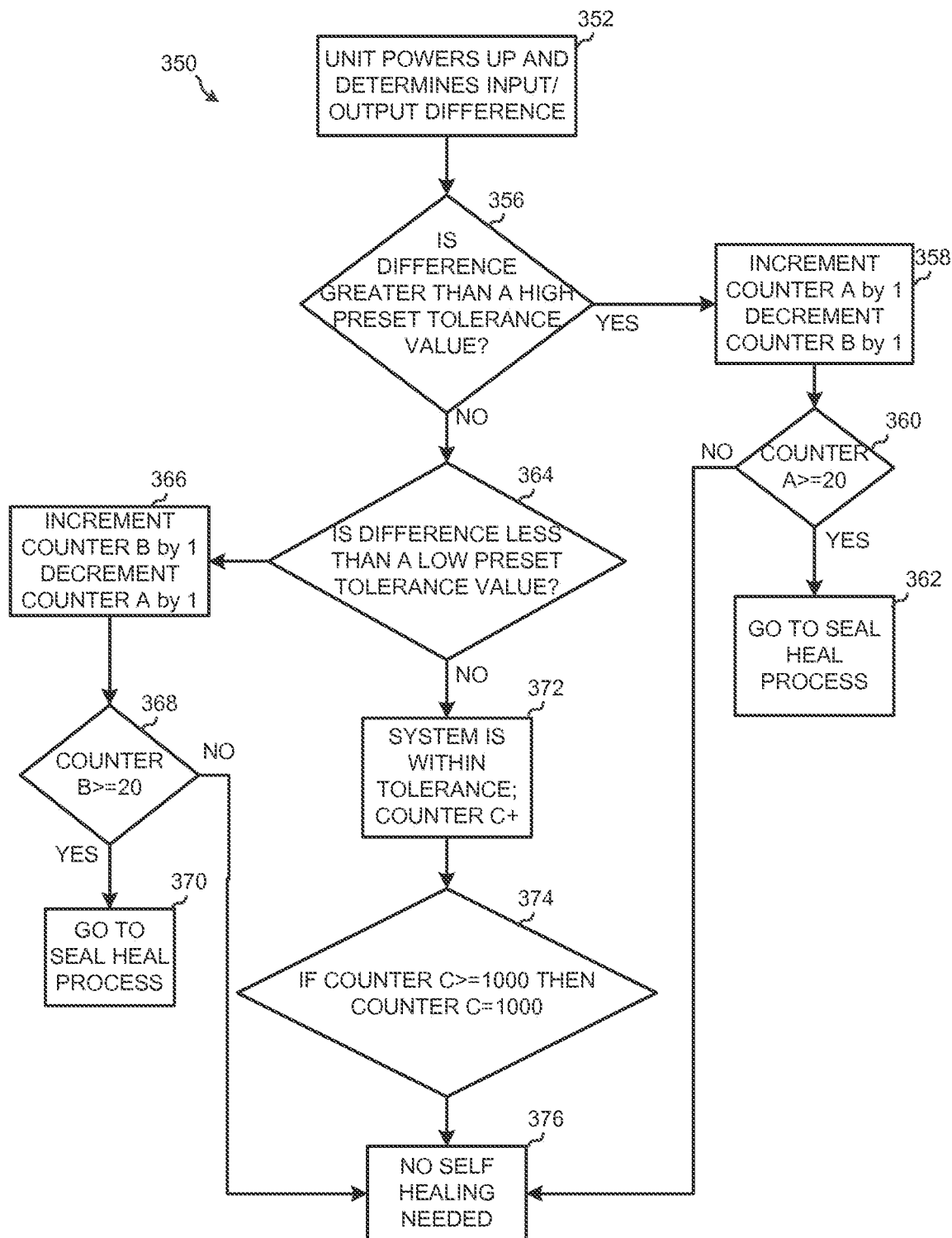
FIG. 7 is a block diagram illustrating an exemplary method for determining whether a calibration of the power steering unit of FIG. 2 is within a tolerance range.

FIG. 7 illustrates a flow diagram 350 of an exemplary method executed by controller 246 of FIG. 4 of self-checking the calibration of the power steering unit 252. At block 352, power steering unit 252 powers up following the ignition cycle, and controller 246 determines the angular difference between the input and output steering shafts, i.e., the input torque to steering assembly 180. At block 356, controller 246 determines whether the input/output angular difference is greater than an upper limit preset tolerance value stored in memory. If the difference exceeds the upper limit preset tolerance value at block 356, controller 246 increments a Counter A by 1 and decrements a Counter B by 1 at block 358. At block 360, if the Counter A is greater than or equal to a value of 20, controller 246 executes the self-heal process at block 362, as described herein with respect to FIG. 8. If the Counter A is less than 20 at block 360, controller 246 determines that the self-heal process is not yet required at block 376 and execution of method 350 is complete until the next ignition cycle.

If the input/output difference is not greater than the upper limit preset tolerance value at block 356 but is less than the lower limit preset tolerance value at block 364, controller 246 increments the Counter B by 1 and decrements the Counter A by 1 at block 366. In one embodiment, the lower limit preset tolerance value is a negative number indicative of an offset in the opposite steering direction. At block 368, if the Counter B is greater than or equal to a value of 20, controller 246 executes the self-heal process at block 370, as described herein with respect to FIG. 8. If the Counter B is less than 20 at block 368, controller 246 determines that the self-heal process is not required at block 376 and execution of method 350 is complete until the next ignition cycle.

As such, controller 246 initiates the self-heal process after a threshold consecutive number (e.g., 20=A=B) of ignition cycles where the calibration offset of the power steering unit 252 is either greater than the upper tolerance value or less than the lower tolerance value. In one embodiment, the requirement for a threshold number of consecutive instances when the calibration offset is out of the tolerance range serves to reduce the likelihood of initiating the self-heal process under improper conditions. For example, if the detected input torque is due to acceptable external forces such as an operator applying steering torque at startup or the wheel being parked at an angle against an object at startup, the self-heal process should not be executed.

If the input/output angular difference is within the tolerance range, controller 246 determines at block 372 that the power steering unit 252 is operating within the correct calibration tolerance. In one embodiment, controller 246 increments a Counter C by 1 at block 372. At block 374, if Counter C is greater than 1000, Counter C is held at 1000. As such, controller 246 illustratively keeps a record of the number of consecutive ignition cycles (illustratively up to 1000 cycles) that the power steering unit 252 is within the calibration tolerance range. At block 376, controller 246 determines that the self-heal process is not required and execution of method 350 is complete until the next ignition cycle.

In some embodiments, controller 246 performs a consistency check for the out of tolerance condition to expedite execution of the self-heal process. For example, at each execution of method 350 (illustratively at each ignition cycle), controller 246 compares the last measured out of tolerance value (e.g., the previous input/output angular difference measured at the previous ignition cycle) to the currently measured out of tolerance value (e.g., the current input/output angular difference). If the last measured out of tolerance value is within a threshold range R of the currently measured out of tolerance value for a predetermined consecutive number of ignition cycles, the self-heal process is initiated after the predetermined consecutive number of ignition cycles, which is less than the Counters A or B. For example, the predetermined consecutive number of ignition cycles may be five or ten or any suitable threshold number less than Counters A and B. The threshold range R may be any suitable range, such as within 1 or 2 nm. Accordingly, in this embodiment, if a same or similar out of tolerance value is observed in a threshold number of consecutive ignition cycles, the self-heal process is initiated prior to reaching the number identified with Counters A or B to expedite the self-heal process.

Figure 8:
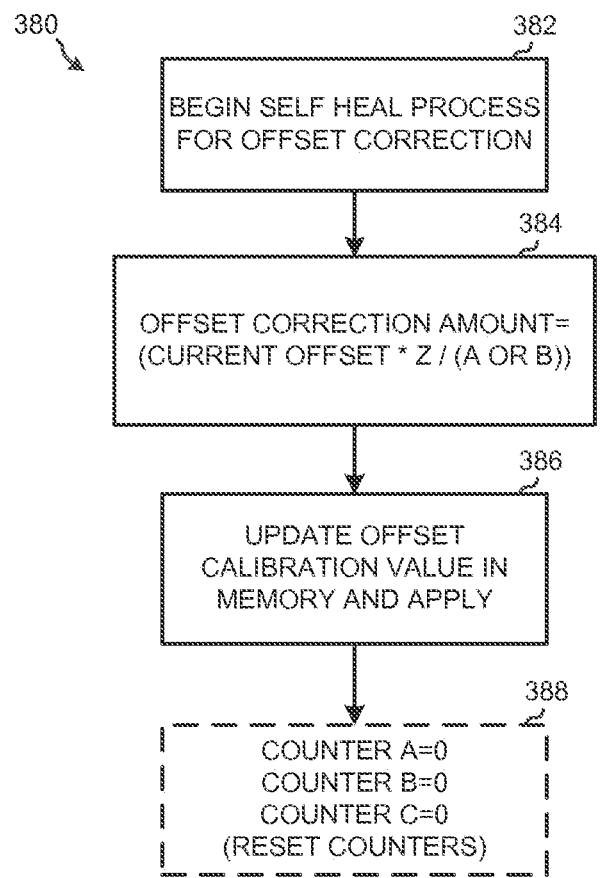
FIG. 8 is a block diagram illustrating an exemplary method for correcting a calibration offset determined in the method of FIG. 7 that is outside the tolerance range.

When controller 246 determines that the self-heal process is required at block 362 or block 370 of FIG. 7, controller 246 executes the self-heal process. Referring to FIG. 8, an exemplary self-heal method for positive or negative offset correction is illustrated in flow diagram 380 and begins at block 382. At block 384, controller 246 calculates an amount of offset correction. In the illustrated embodiment, controller 246 determines the offset correction by dividing the current detected offset (e.g., the input/output angular difference) by Counter A for positive offset or by Counter B for negative offset. Controller 246 multiplies that product by Multiplier Z. Multiplier Z is a multiplier used to increase or decrease the amount of incremental offset correction that is applied per iteration of the self-heal process. For example, if A and Z for positive offset (or B and Z for negative offset) are both equal to 20, the amount of offset correction equals the amount of the detected offset, and the entire offset correction is applied at once. If Z is less than the value of the applicable Counter A or B, a fractional amount of correction is applied. For example, if Z equals 1 and Counter A (or B) equals 20, then one twentieth of the detected current offset is applied as the correction offset on this iteration. As such, an incremental adjustment to the calibration is calculated and implemented by controller 246. After a number of ignition cycles, the incremental corrections will eventually bring the offset to within the tolerance range. Other suitable formulas for calculating the offset correction amount may be provided.

If the detected offset is positive, the offset correction has a negative value, and if the detected offset is negative, the offset correction has a positive value, thereby bringing the actual offset back within tolerance range. At block 386, controller 246 updates the offset calibration in memory based on the offset correction amount and applies the offset correction to power steering unit 252. In one embodiment, controller 246 applies the offset correction by compensating for the offset correction in the power steering assist commands to motor 252 (FIG. 3). At block 288, controller 246 optionally resets the counters including Counter A (for positive offset correction), Counter B (for negative offset correction), and Counter C.

In some embodiments, for existing power steering units 252 that have an offset bias with one or more components (e.g., steering shafts), faster self-healing may be accomplished by continuously cycling the ignition on and off to simulate multiple days or weeks of operator usage in a shorter time (e.g., in minutes). For example, a dealer may cycle the ignition multiple times over a short period so that controller 246 applies the incremental changes to the offset at an accelerated rate. Controller 246 may also be programmed to implement the self-check of FIG. 7 upon detecting a triggering event other than an ignition cycle, such as a user input requesting a self-check or a pre-ignition battery-on event, for example. In some embodiments, controller 246 is operative to detect leaky bucket type counters, to reset the Counters A and B to zero on predetermined events, and/or to implement accelerated counter conditions for use by a dealer to invoke a rapid heal condition.

Figure 9:
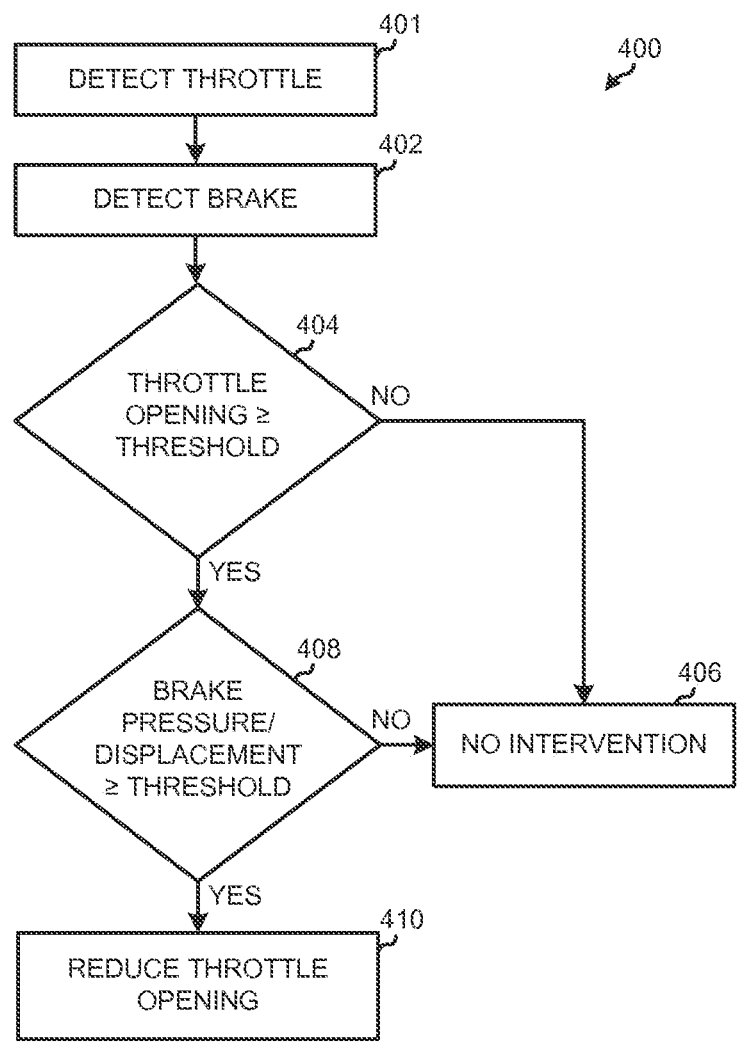
FIG. 9 is a block diagram illustrating an exemplary method for throttle override.

Referring to FIG. 9, controller 102 of FIG. 2 is further operative to execute a throttle override control for vehicle 10. FIG. 9 illustrates a flow diagram 400 of an exemplary method of overriding control of throttle valve 114 (FIG. 2) when brake operator 134 of FIG. 2 (or the vehicle brake) is applied. In some embodiments, the throttle override method of FIG. 9 serves to release a stuck or jammed throttle valve 114 or to close the throttle valve 114 when throttle operator 126 is stuck or jammed. In some embodiments, the brake throttle override method of FIG. 9 serves to reduce the likelihood of the brake and the throttle being applied at the same time. Reference is made to FIG. 2 throughout the following description of FIG. 9.

At block 401, controller 102 detects application of the throttle. For example, controller 102 may detect a displacement of at least one of throttle operator 126 and throttle valve 114 to detect application of the throttle. At block 402, controller 102 detects the application of brake operator 134 (e.g., brake pedal) based on a signal output from brake operator sensor 136. In the illustrated embodiment, brake operator sensor 136 is operative to detect at least one of a pressure applied to brake operator 134 and a displacement of brake operator 134. If the opening or position of throttle valve 114 (or the displacement of throttle operator 126) is greater than or equal to a first threshold at block 404, and if the detected brake operator pressure (or brake operator displacement) is greater than or equal to a second threshold at block 408, controller 102 reduces the opening of throttle valve 114 at block 410 regardless of an operator demand for a greater throttle valve opening. In one embodiment, controller 102 closes the throttle valve 114 at block 410 to a zero percent opening. In another embodiment, controller 102 reduces the opening of throttle valve 114 to at or below the first threshold opening.

In some embodiments, controller 102 waits a predetermined delay after detecting the brake application before reducing the throttle opening a calibrated amount. For example, upon detecting the brake operator pressure or displacement exceeding the second threshold at block 408 for a threshold time (e.g., one second, two seconds, or any suitable delay), controller 102 then reduces the throttle opening at block 410. In some embodiments, reducing the throttle opening at block 410 includes calibrating a ramp down of the throttle opening. In particular, the throttle valve opening is gradually reduced to the target reduced opening in response to the detected brake application exceeding the threshold.

In some embodiments, the first threshold of block 404 may be a zero percent throttle opening, a five percent throttle opening, or another suitable throttle opening. In some embodiments, the second threshold of block 408 may be a five percent total applied pressure or a five percent displacement of brake operator 134 or another suitable pressure or displacement value. In one embodiment, the first and second thresholds are adjustable by the operator or dealer based on user input provided via the user interface of vehicle 10. In an alternative embodiment, the position of the vehicle brake may be detected at block 402 and compared with a corresponding threshold at block 408.

If the throttle valve opening at block 404 is less than the first threshold value, or if the brake pressure or displacement at block 408 is less than the second threshold value, controller 102 does not intervene to close or reduce the opening of throttle valve 114, as represented at block 406.

Figure 10:
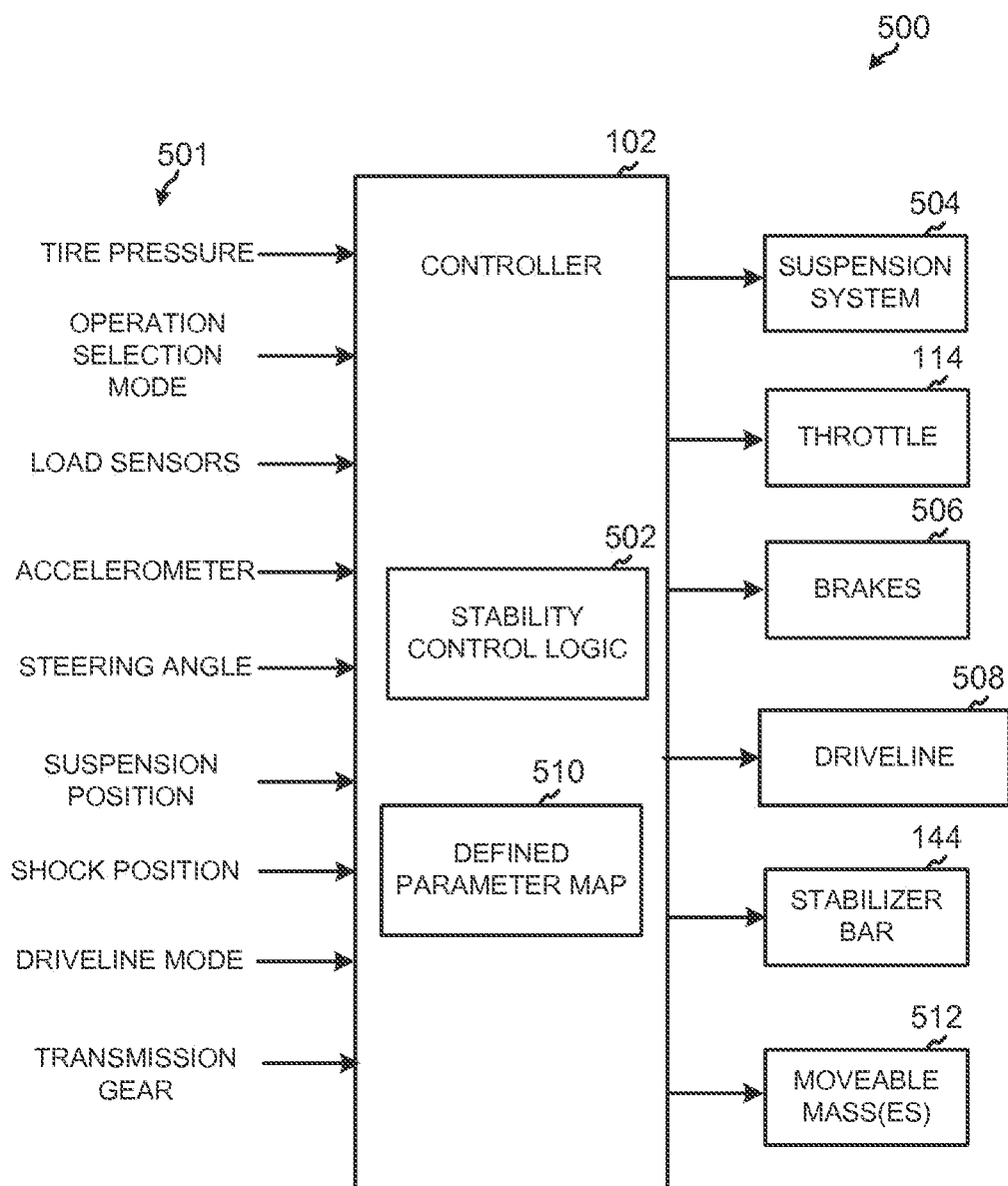
FIG. 10 is representative view of a stability control system of the vehicle of FIG. 1.

Controller 102 of FIG. 2 is further operative to provide stability control to vehicle 10. Referring to FIG. 10, an exemplary stability control system 500 is illustrated. Controller 102 includes stability control logic 502 operative to implement various control measures to stabilize vehicle 10 during vehicle operation based on monitored vehicle parameters. Controller 102 receives inputs 501 from sensors such as tire pressure, an operation selection mode (e.g., racing mode, sand dune mode, trail riding mode, work mode, snow/ice mode, etc.), load sensor output, accelerometer output, inclinometer output, steering angle, suspension and shock position, selected driveline mode (e.g., 2WD or 4WD, state of differential, transmission gear, etc.), and other suitable inputs. In one embodiment, the controller 102 receives inputs from three-axis accelerometers and three-axis gyroscopes mounted to vehicle 10. In one embodiment, an accelerometer and gyroscope are mounted inside an engine control unit (ECU) of vehicle 10 (e.g., controller 102). Based on one or more of inputs 501, stability control logic 502 actively controls various systems and subsystems to improve the stability of vehicle 10.

For example, stability control logic 502 adjusts the shocks and springs of the suspension system 504 of vehicle 10 to improve stability. For additional detail on damping control and adjustment of shock absorbers and springs, see U.S. application Ser. No. 14/074,340, filed Nov. 7, 2013, and U.S. application Ser. No. 14/507,355, filed Oct. 6, 2014, both entitled VEHICLE HAVING SUSPENSION WITH CONTINUOUS DAMPING CONTROL, the entire disclosures of which are expressly incorporated by reference herein.

In one embodiment, stability control logic 502 controls the throttle valve 114 and brakes 506 of vehicle 10 to provide stability control in various vehicle conditions. In one embodiment, logic 502 locks and unlocks differentials 145 (FIG. 2) of driveline 508 to provide additional vehicle stability. In one embodiment, logic 502 engages and adjusts the stiffness of torsion (stabilizer) bar 144 to provide additional vehicle stability. In one embodiment, controller 102 further controls one or more moveable masses 512 to adjust vehicle weight distribution, as described herein.

Figure 11:
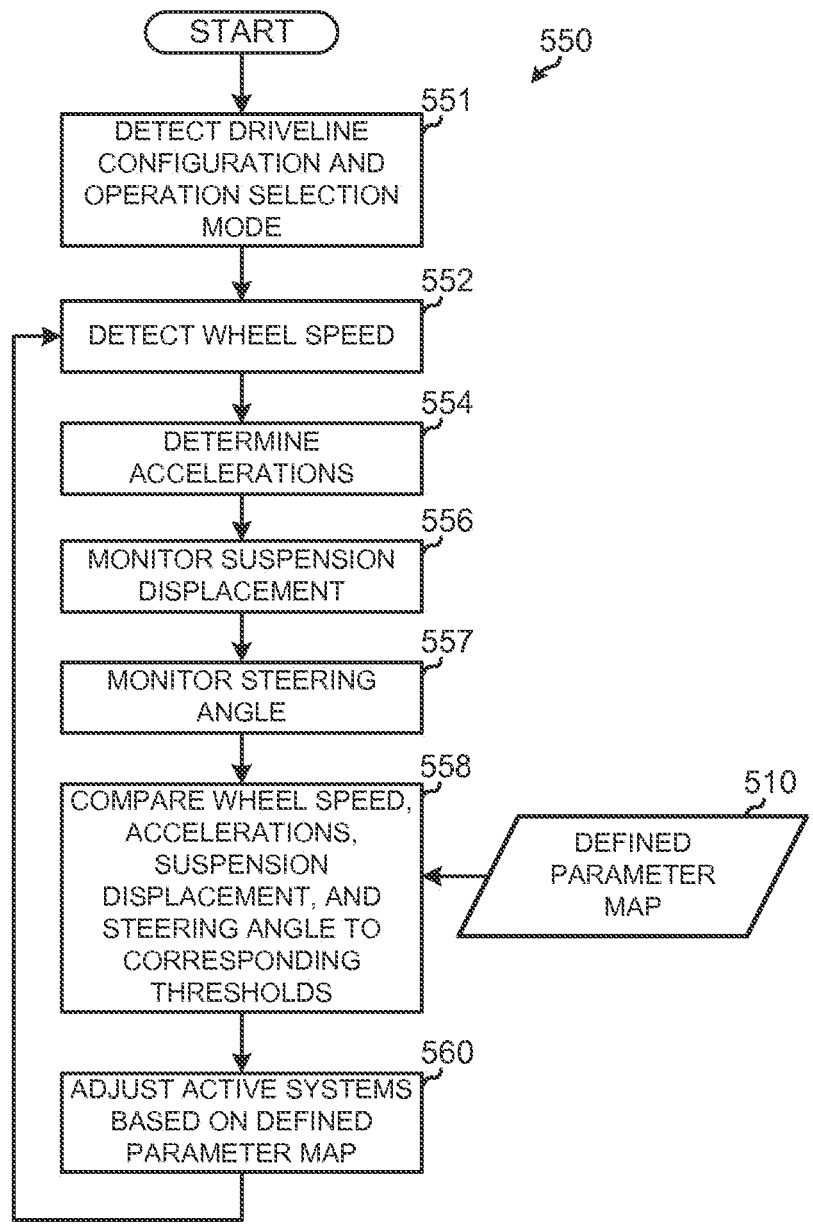
FIG. 11 is a block diagram illustrating an exemplary method for adjusting active vehicle systems based on a terrain traversed by the vehicle of FIG. 1.

FIG. 11 illustrates a flow diagram 550 of an exemplary method of controlling vehicle stability based on various terrains traversed by vehicle 10. At block 551, controller 102 detects a driveline configuration selected by an operator based on user input and sensor output. As described herein, the driveline configuration includes the number of driven wheels (e.g., 2WD or 4WD), the state of the differential (e.g., open, locked, or controlled slip), and/or the selected transmission gear ratio. At block 551, controller 102 also detects an operation selection mode (e.g., racing mode, sand dune mode, trail riding mode, work mode, snow/ice mode, etc.) selected by a user via mode selector 118 (FIG. 2), as described herein. At block 552, controller 102 detects a wheel speed of vehicle 10 based on output from speed sensor 110 (FIG. 2). At block 554, controller 102 determines one or more vehicle accelerations. For example, controller 102 determines the wheel acceleration based on the detected wheel speed and linear and angular accelerations of vehicle 10 based on accelerometer output. At block 556, controller 102 monitors the suspension displacement based on output from one or more suspension sensors 138 (FIG. 2). For example, a shock position at each wheel may be monitored at block 556 to detect a compression or expansion of the shocks or springs, and a suspension position may be monitored at block 556 to detect the height of the chassis relative to the wheels. At block 557, controller 102 monitors the steering angle of the steering assembly, such as steering assembly 180 of FIG. 3.

At block 558, controller 102 compares the detected parameters, including for example the wheel speed, wheel and vehicle accelerations, the suspension displacement, and the steering angle, to corresponding thresholds defined in a parameter map 510 calibrated for various terrains traversed by the vehicle 10. Parameter map 510 is illustratively stored in memory of controller 102 (FIG. 10). The defined parameter map 510 provides thresholds for various terrain conditions. In one embodiment, one or more thresholds in defined parameter map 510 are based on the driveline configuration of vehicle 10 and an operation selection mode identified at block 551 (e.g., racing mode, sand dune mode, trail riding mode, work mode, snow/ice mode, etc.). For example, one or more thresholds in defined parameter map 510 have different values for different driveline conditions and operation modes. Based on the comparison of the detected parameters to the thresholds in defined parameter map 510, controller 102 is operative to adjust active systems of vehicle 10 at block 560 to improve vehicle stability in different terrain conditions.

For example, suspension displacement is monitored and compared to the detected vehicle speed to determine the rate the shocks are moving at the detected vehicle speed. As the suspension displacement rate exceeds various thresholds at different speeds, the harshness or smoothness of the terrain may be determined and adjustment to active systems may be implemented. A comparison of accelerometer output to acceleration thresholds is also used to determine the harshness of the terrain, such as to determine the suspension displacement rate and/or to detect sudden accelerations (e.g., angular or linear) of vehicle 10 in various directions due to bumpy terrain. Further, wheel acceleration in combination with shock displacement and accelerometer output is used by controller 102 to determine slick or low traction conditions, such as with ice/snow, gravel, or sand terrains. Based on the wheel speed, the shock displacement, the rate of shock displacement, vehicle accelerations, and/or driveline configuration, controller 102 determines the harshness or roughness of the terrain based on the defined parameter map 510.

Controller 102 at block 560 adjusts the operation and calibration of one or more active systems of vehicle 10 to provide improved stability for vehicle 10 based on the comparisons of block 558. For example, one or more active systems are adjusted by controller 102 in response to a harsher or smoother terrain. In one embodiment, the active systems are adjusted based on the defined parameter map 510 according to the driveline configuration and the operation selection mode, as described herein. Exemplary active systems that are adjusted at block 560 include suspension (e.g., shock and/or spring damping and vehicle height), stabilizer bar 144, braking, electronic throttle control, power steering, moveable masses 512, transmission gear, and driveline configuration (4WD vs 2WD, differential engagement, etc.). Controller 102 actively monitors feedback from each of these systems and adjusts the configuration of one or more of these systems to dynamically improve vehicle stability.

In one embodiment, controller 102 uses parameter map 510 to adjust the stiffness of the suspension system 139 (FIG. 2), including the shocks and/or springs, based on the terrain. For example, low suspension displacement at higher vehicle speeds is indicative of a smooth terrain, such as a road terrain, for example. Accordingly, upon detection of the suspension displacement and/or displacement rate being below a first displacement threshold and the vehicle speed exceeding a high speed threshold, controller 102 increases the stiffness of suspension system 139. Upon detection of the suspension displacement and/or displacement rate exceeding a second displacement threshold and the vehicle speed being below a low speed threshold, which is indicative of a rough terrain, controller 102 decreases the stiffness of suspension system 139 to soften vehicle 10. In one embodiment, the first displacement threshold is less than the second displacement threshold. In one embodiment, the low speed threshold is less than the high speed threshold, although the low and high speed thresholds may alternatively be the same. The stiffness of the suspension may be adjusted based on a fluid level in the shocks or a position of the shocks or springs, as described in U.S. application Ser. No. 14/507,355, filed Oct. 6, 2014, entitled VEHICLE HAVING SUSPENSION WITH CONTINUOUS DAMPING CONTROL.

In one embodiment, controller 102 uses parameter map 510 to adjust the vehicle ride height (load level) of vehicle 10 based on the terrain. The vehicle ride height is adjusted with suspension system 139, such as by adjusting the position of the springs or shocks. In one embodiment, controller 102 lowers the vehicle ride height in response to detecting rough terrain, i.e., detecting the suspension displacement and/or displacement rate exceeding a threshold for a corresponding vehicle speed. Further, controller 102 lowers the vehicle ride height in smooth terrain at high vehicle speeds. For example, in response to the suspension displacement and/or displacement rate being below a threshold and the vehicle speed exceeding a high speed threshold, controller 102 lowers the vehicle ride height by a predetermined amount.

In one embodiment, controller 102 uses parameter map 510 to adjust the stiffness of stabilizer bar 144 (FIG. 2) based on the terrain. In response to detecting smooth terrain, controller 102 increases the stiffness of stabilizer bar 144. In response to detecting rough terrain, controller 102 decreases the stiffness of stabilizer bar 144. The smooth and rough terrain is detected based on displacement and speed thresholds of parameter map 510 as described above.

In one embodiment, controller 102 uses parameter map 510 to adjust the driveline configuration based on the terrain. For example, controller 102 changes the driveline between 2WD and 4WD configurations and/or between states of the differential based on the terrain. The smooth and rough terrain is detected based on displacement and speed thresholds of parameter map 510 as described above. In one embodiment, controller 102 changes the driveline configuration by changing from an open or locked state of the differential to a controlled slip state. In the controlled slip state, the controller adjusts a slip of the differential based on a detected steering angle and a detected yaw rate of the vehicle.

In one embodiment, controller 102 is further operative to actively control one or more active systems upon detection of an airborne condition to improve the trajectory and landing of vehicle 10. See, for example, the exemplary airborne controls disclosed in U.S. patent application Ser. No. 13/652,253, filed Oct. 15, 2012, entitled PRIMARY CLUTCH ELECTRONIC CVT, the entire disclosure of which is expressly incorporated by reference herein.

In some embodiments, components and systems of vehicle 10 are packaged for improved weight distribution depending on the intended vehicle use. Vehicle 10 may be manufactured with a different weight distribution depending on the vehicle model. For example, the manufacturer may receive an order that identifies a targeted operating environment of the vehicle, such as trail riding, work operations, racing, etc. The manufacturer configures the weight distribution of the vehicle based on the intended operating environment. For example, for a vehicle 10 that is intended for racing or airborne conditions, the vehicle 10 may be configured such that a greater mass is towards the front and rear ends of the vehicle 10 to provide additional stability in the air. Components such as engine 130, the radiator, generator, engine crank shaft, spare tire, fake weight, and/or battery 109 (FIG. 2) are therefore positioned closer to the front or rear ends of vehicle 10 for improved weight distribution and improved pitch inertia. Similarly, for a vehicle 10 intended for slower speeds and tight turns and not intended for airborne conditions, such as for trail riding or work operations, the mass is positioned more towards the center of the vehicle 10 to provide less pitch inertia.

In some embodiments, vehicle 10 includes one or more movable masses 512 (FIG. 10) to allow an operator or dealer to vary the weight distribution of vehicle 10 after purchase of the vehicle 10. The moveable masses 512 are either automatically moved by actuators of vehicle 10 controlled by controller 102 or manually moved by an operator prior to vehicle operation. For example, vehicle 10 may be configured such that an operator or dealer manually moves the location of various components on the vehicle 10, such as the battery 109, radiator, seat, generator, engine crank shaft, spare tire, fake weight, or other suitable components, based on the intended operating environment. In another embodiment, the operator selects an operation selection mode via mode selector 118 (FIG. 2), and controller 102 automatically controls actuators to move the moveable masses 512 based on the selected operation mode. For example, controller 102 moves masses 512 towards the front and rear ends of vehicle 10 in response to user selection of a sand dune mode or racing mode, and controller 102 moves masses 512 towards the center of vehicle 10 in response to user selection of a trail mode or work mode. Further, vehicle 10 may include a spare tire carrier that is attached to the rear end of vehicle 10 for improved weight distribution. The spare tire carrier may be filled with water to add additional mass. Further still, a detachable front or rear bumper may be provided to add mass to an end of vehicle 10. In addition, flywheels may be mounted to vehicle 10 to further target a specific weight distribution of vehicle 10.

In some embodiments, stability control system 500 of FIG. 10 is operative to automatically vary the location of one or more movable masses 512 (FIG. 10) actively during vehicle operation. For example, moveable masses 512 include a flywheel system or gyroscope system controlled by controller 102 to actively adjust mass distribution during vehicle operation based on the detected vehicle stability and/or detected terrain. The vehicle stability is detected by controller 102 based on various inputs such as vehicle speed, acceleration, operation mode, vehicle pitch or tilt, and other inputs. For example, a flywheel or gyroscope system is shifted during an airborne condition of vehicle 10 to level the vehicle 10 in response to detection of a vehicle pitch that exceeds a threshold, i.e., a vehicle pitch indicative of a nose dive or non-level condition. The flywheel or gyroscope system is also used to shift mass during turning or cornering operations of vehicle 10. In another embodiment, controller 102 automatically controls the application of the throttle and/or brake during the airborne condition to further improve the pitch of vehicle 10. For example, controller 102 selectively increases the throttle opening to increase driveline inertia and thereby cause the front end of the vehicle 10 to pitch up relative to the rear end of the vehicle, and controller 102 selectively applies the brakes to cause the front end of vehicle 10 to pitch downward relative to the rear end of vehicle 10.

In some embodiments, vehicle stability is improved by decreasing a steering speed of the steering rack (steering ratio). In some embodiments, the steering rack 258 of FIG. 3 is controlled to have a variable ratio based on vehicle speed. For example, for faster vehicle speeds the steering rack 258 has a lower speed and for slower vehicle speeds the rack 258 has a faster speed. In some embodiments, the steering rack ratio is controlled based on operation selection modes programmed into controller 102 of FIG. 2. For example, each drive mode has a variable speed ratio of the steering rack 258 to provide varying steering response based on desired vehicle performance.

In some embodiments, vehicle stability is improved by biasing the speeds of each driven wheel (e.g., wheels 24a, 24b of FIG. 1) for various steering conditions. Oversteering of vehicle 10 may occur when vehicle 10 has a low steering angle and a high yaw rate, and understeering of vehicle 10 may occur when vehicle 10 has a high steering angle and a low yaw rate. In some embodiments, controller 102 is operative to vary the relative speeds of individual wheels to reduce the oversteering or understeering of vehicle 10. For example, controller 102 adjusts the speeds of each wheel 24a, 24b to achieve target wheel speeds for certain steering angles of vehicle 10. In one embodiment, a motor is coupled to each differential (e.g., front, rear, and/or center differential) to control speed variations of each wheel 24a, 24b. Alternatively, a motor is coupled to each driven wheel to vary the speed of the corresponding wheel relative to other driven wheels. Controller 102 controls the motor(s) to vary individual wheel speeds based on the steering angle, the vehicle speed, and yaw or acceleration rates of vehicle 10. In one embodiment, braking of one or more wheels is further used to reduce oversteering and understeering of vehicle.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A recreational vehicle, comprising:
   a plurality of ground engaging members;
   a frame supported by the plurality of ground engaging members;
   a suspension system coupling the plurality of ground engaging members to the frame, the suspension system including at least one adjustable shock absorber having at least one adjustable damping characteristic;
   a first sensor configured to monitor the displacement of the at least one adjustable shock absorber;
   a second sensor configured to monitor the vehicle speed;
   at least one controller operatively coupled to the adjustable shock absorber, the first sensor, and the second sensor, the at least one controller configured to:
      determine a terrain type based upon at least one of a displacement rate of the at least one adjustable shock absorber from the first sensor and a vehicle speed from the second sensor;
      in response to determining the terrain type is a first terrain based upon the displacement rate being a first displacement rate and the vehicle speed being a first speed:
         adjust the adjustable damping characteristic for the at least one adjustable shock absorber to have a first stiffness;
      in response to determining the terrain type is a second terrain based upon the displacement rate being a second displacement rate and the vehicle speed being a second speed, the second displacement rate being greater than the first displacement rate and the second speed being less than the first speed:
         adjust the adjustable damping characteristic for the at least one adjustable shock absorber to have a second stiffness less than the first stiffness.

2. The recreational vehicle of claim 1, wherein the first sensor is mounted internally to the at least one adjustable shock absorber.

3. The recreational vehicle of claim 1, wherein the first sensor is supported by the vehicle and positioned adjacent the suspension system.

4. The recreational vehicle of claim 1, wherein the first terrain is a smooth terrain.

5. The recreational vehicle of claim 1, wherein the second terrain is a rough terrain.

6. The recreational vehicle of claim 1, further comprising a stability system, the at least one controller configured to determine if the recreational vehicle has a first vehicle condition based upon at least one of the first sensor and the second sensor, and in response to determining the recreational vehicle has the first vehicle condition, adjust the adjustable damping characteristic for the at least one adjustable shock absorber.

7. A recreational vehicle, comprising:
   a plurality of ground engaging members;
   a frame supported by the plurality of ground engaging members;
   a suspension system coupling the plurality of ground engaging members to the frame, the suspension system including at least one adjustable shock absorber having at least one adjustable damping characteristic, the suspension system further configured to alter a vehicle ride height;
   a first sensor supported by the vehicle, the first sensor configured to monitor the position of the at least one adjustable shock absorber;
   a second sensor configured to monitor the vehicle speed;
   at least one controller operatively coupled to the adjustable shock absorber, the first sensor, and the second sensor, the at least one controller configured to:
      determine a terrain type based upon at least one of a displacement rate of the at least one adjustable shock absorber from the first sensor and a vehicle speed from the second sensor;
      in response to determining the terrain type is a first terrain based upon the displacement rate being a first displacement rate and the vehicle speed being a first speed:
         adjust the vehicle ride height to be a first vehicle ride height by adjusting the position of the at least one adjustable shock absorber;
      in response to determining the terrain type is a second terrain based upon the displacement rate being a second displacement rate and the vehicle speed being a second speed, the second displacement rate being less than the first displacement rate and the second speed being greater than the first speed:
         adjust the vehicle ride height to be a second vehicle ride height by adjusting the position of the at least one adjustable shock absorber, the second vehicle ride height being less than the first vehicle ride height.

8. The recreational vehicle of claim 7, further comprising a second suspension system supported by the vehicle and connecting a left side suspension and a right side suspension, the controller is configured to alter the configuration of the second suspension system in response to the terrain being the second terrain, the controller configured to improve the stability of the recreational vehicle by providing one or more signals to the suspension system to adjust a stiffness of the suspension system.

9. The recreational vehicle of claim 7, further comprising a driveline system, the controller is configured to alter the configuration of the driveline system in response to the terrain being the second terrain, the controller configured to improve the stability of the recreational vehicle by providing one or more signals to the driveline system to adjust a driveline configuration of the driveline system.

10. The recreational vehicle of claim 7, wherein the first sensor is mounted internally to the at least one adjustable shock absorber.

11. The recreational vehicle of claim 7, wherein the first sensor is supported by the vehicle and positioned adjacent the suspension system.

12. The recreational vehicle of claim 7, wherein the first terrain is a rough terrain.

13. The recreational vehicle of claim 7, wherein the second terrain is a smooth terrain.

14. A method of controlling a recreational vehicle, the method comprising the steps of:
  detecting, by a controller of the recreational vehicle, a characteristic of a suspension system of the vehicle during operation of the vehicle, wherein the suspension system comprises
at least one adjustable shock absorber;
  comparing, by the controller, at least one detected parameter of the vehicle to at least one threshold stored in memory accessible by the controller, the at least one detected parameter including a rate of change of the characteristic of the suspension system;
  in response to the comparing, identifying, by the controller a terrain characteristic; and
  in response to the identifying, adjusting, by the controller, an adjustable damping profile for the at least one adjustable shock absorber and a configuration of a second system operatively coupled to the at least one ground engaging member.

15. The method of claim 14, further comprising the step of detecting, by the controller, a vehicle acceleration based on at least one accelerometer.

16. The method of claim 15, wherein the at least one detected parameter further includes the vehicle acceleration.

17. The method of claim 16, further comprising the step of detecting, by the controller, an acceleration of at least one ground engaging member of the recreational vehicle.

18. The method of claim 17, wherein the at least one detected parameter further includes the acceleration of the at least one ground engaging member.

* * * * *